(12) United States Patent
Hahn et al.

(10) Patent No.: US 9,215,880 B2
(45) Date of Patent: Dec. 22, 2015

(54) COMBINATION AUTOMATED AND HAND DEBONING APPARATUS AND METHOD WITH SINGLE UNIT PROCESSING

(71) Applicant: Baader Linco, Inc., Kansas City, KS (US)

(72) Inventors: Oliver Hahn, Parkville, MO (US); Ronnie Lee Avey, Gladstone, MO (US); Frank J. Criscione, II, Kansas City, MO (US); Ralph A. Miller, Parkville, MO (US)

(73) Assignee: Baader Linco, Inc., Kansas City, KS (US)

( * ) Notice: Subject to any disclaimer, the term of this patent is extended or adjusted under 35 U.S.C. 154(b) by 272 days.

(21) Appl. No.: 13/856,281

(22) Filed: Apr. 3, 2013

(65) Prior Publication Data

US 2013/0280998 A1  Oct. 24, 2013

Related U.S. Application Data

(60) Provisional application No. 61/637,102, filed on Apr. 23, 2012.

(51) Int. Cl.
*A22C 17/00* (2006.01)
*A22C 21/00* (2006.01)

(52) U.S. Cl.
CPC ........... *A22C 21/0069* (2013.01); *A22C 21/003* (2013.01)

(58) Field of Classification Search
USPC .......... 452/135–137, 149–153, 155, 156, 198
See application file for complete search history.

(56) References Cited

U.S. PATENT DOCUMENTS

| | | | | |
|---|---|---|---|---|
| 2,237,203 | A * | 4/1941 | Swanson | 452/106 |
| 4,716,624 | A * | 1/1988 | Massey, Jr. | 452/135 |
| 5,088,957 | A * | 2/1992 | Gagliardi, Jr. | 452/149 |
| 5,312,291 | A | 5/1994 | van den Nieuwelaar | |
| 5,545,083 | A * | 8/1996 | Bargele et al. | 452/136 |
| 5,932,278 | A * | 8/1999 | Gagliardi, Jr. | 426/644 |
| 6,912,434 | B2 | 6/2005 | van den Nieuwelaar | |
| 8,231,444 | B2 * | 7/2012 | De Vos et al. | 452/136 |
| 8,500,522 | B2 * | 8/2013 | Drabbels et al. | 452/136 |
| 8,784,165 | B2 * | 7/2014 | Vonk et al. | 452/135 |

* cited by examiner

*Primary Examiner* — Richard Price, Jr.
(74) *Attorney, Agent, or Firm* — Spencer Fane Britt & Browne LLP

(57) ABSTRACT

An apparatus and method for separating wanted tissues from a bird carcass comprises mechanical and manual manipulation of the tissues. Mechanical manipulation includes scoring the lateral side of the carcass below the ribs between the neck opening and vent to separate the breast tissue from the skeletal system, and cutting the breast tissue and tenderloin tissue from the breast bone. Manual manipulation of the wanted tissues includes: mounting the carcass on a fixture, grasping the breast tissue adjacent the neck opening, and moving the hand toward the vent to separate the breast tissue from the carcass; and grasping the tenderloin tissue adjacent the neck opening, and moving the hand toward the vent to separate the tenderloin tissue from the carcass. Alternatively, the breast tissue may be harvested as a butterfly filet by scoring the lateral side of the carcass and removing the breast tissue from the carcass.

13 Claims, 20 Drawing Sheets

COMBINATION AUTOMATED AND HAND DEBONING APPARATUS AND METHOD WITH SINGLE UNIT PROCESSING

CROSS-REFERENCE TO RELATED APPLICATION

This application claims the benefit of U.S. Provisional Application No. 61/637,102, filed Apr. 23, 2012, the contents of which are hereby incorporated herein by reference.

BACKGROUND

The present disclosed subject matter relates generally to animal processing, and more specifically to an apparatus and method of partially separating the tissue from the skeletal structure of a bird during processing.

Automation of animal processing lowers the cost of food products for consumers. Automation of the process is accomplished by use of machinery that transport animal carcasses through processing stations, mechanically positions the carcasses, and mechanically removes wanted and unwanted tissues. Wanted tissues include the muscle tissue of the animal which is purchased by consumers. Eviscerated animal carcasses often undergo additional processing in order to separate the wanted tissues of the animal from the carcass for sale to consumers. Although it is advantageous to automate as many steps as possible during processing of the animal carcass, for some steps it is desirable to manually process the carcass in order to maximize the yield of the tissue harvested from the animal or to avoid the introduction of unwanted skeletal material into the harvested tissue.

SUMMARY

An apparatus and method for separating wanted tissues from a bird carcass comprises a mechanical and manual manipulation of the tissues. The mechanical manipulation includes scoring the lateral side of the carcass below the ribs between the neck opening and the vent to separate the breast tissue from the skeletal system, and separating the breast tissue and tenderloin tissue from the breast bone. The manual manipulation or hand harvesting of the wanted tissues includes: mounting the carcass on a fixture, grasping the breast tissue adjacent the neck opening, and moving the hand toward the vent to separate the breast tissue from the carcass; and grasping the tenderloin tissue adjacent the neck opening, and moving the hand toward the vent to separate the tenderloin tissue from the carcass.

Mechanical scoring of the lateral side of carcass may be accomplished by a cut assembly. The carcass may be mounted on an item mount that is connected to a conveyor system for transporting the carcass through several processing stations located about the housing of a processing machine. The cut assembly includes a blade connected to a blade mount that is biased toward the item mount for scoring the lateral side of the carcass below the ribs between the neck opening and the vent. The cut assembly may be articulated for adjusting the position of the blade relative to the carcass. The articulated assembly includes an arm, a support connected to the arm and the housing, a jig connected to the arm and the blade mount, and an extension extending between the arm and the jig. A biasing member connected to the articulated assembly biases the blade toward the item mount, and a biasing member connected to the blade mount for biasing the blade toward the item mount.

Mechanical separation of the breast tissue and tenderloin tissue from the breast bone may be accomplished by a separator assembly. The separator assembly includes a roller for supporting the ventral end of the carcass as it is advanced into engagement with two spaced apart blades that pass on either side of the breast bone and separate the breast tissue and tenderloin tissue from the breast bone. The roller may include two opposing, spaced apart rollers that each taper inward from a relatively wide base to a relatively narrow tip forming a general U-shaped concave guide. The blades are rotatably connected to a mount and pass between the spaced apart rollers to engage the carcass.

Hand harvesting of the breast tissue and tenderloin tissue after one or more of the aforementioned mechanical manipulations of the tissue may be accomplished by mounting the carcass on a fixture allowing manual removal of the tissue from the carcass. If the carcass has received a mechanical scoring of the lateral side, but no mechanical separation of the breast tissue and tenderloin tissue from the breast bone, the breast tissue may be harvested as a butterfly fillet by grasping the breast tissue adjacent the opening and moving the hands toward the vent to separate the breast tissue butterfly fillet from the carcass. The tenderloin tissue is harvested by scraping the tenderloin tissue from the carcass along the breast bone. The tenderloin tissue thereafter remains connected to the carcass adjacent the neck opening. The fixture may by reoriented to position the neck opening in the downward direction causing the tenderloins to fall from their natural positions and remaining connected to the carcass by tendons. The tenderloin is then removed from the carcass by cutting the tenderloin from the tendon.

If the carcass has received a mechanical scoring of the lateral side and a mechanical separation of the breast tissue and tenderloin tissue from the breast bone by the separator assembly, each breast is harvested by grasping the tissue adjacent the neck opening by encircling the tissue with the thumb and a finger of a hand, and moving the hand toward the vent to separate the tissue from the carcass. The tenderloin tissue is harvested by grasping the tissue adjacent the neck opening by encircling the tissue with the thumb and a finger of a hand, and moving the hand toward the vent to separate the tissue from the carcass.

The cut assembly and separator assembly may be used alone or in conjunction with other processing stations of a processing machine, and may be retrofitted to existing processing machines. Alternatively, the operations of the cut assembly or the separator assembly may be accomplished by hand, followed by hand harvesting of the breast tissue and tenderloin tissue.

BRIEF DESCRIPTION OF THE DRAWINGS

The drawings constitute a part of this specification and include exemplary embodiments of the disclosed subject matter and illustrate various objects and features thereof.

DETAILED DESCRIPTION

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed subject matter in virtually any appropriately detailed structure.

Certain terminology will be used in the following description for convenience in reference only and will not be limiting. For example, up, down, front, back, left and right refer to the apparatus as orientated in the view being referred to. The words "inwardly" and "outwardly" refer to directions toward and away from, respectively, the geometric center of the aspect being described and designated parts thereof. Said terminology will include the words specifically mentioned, derivatives thereof, and words of similar meaning.

Figure 1:
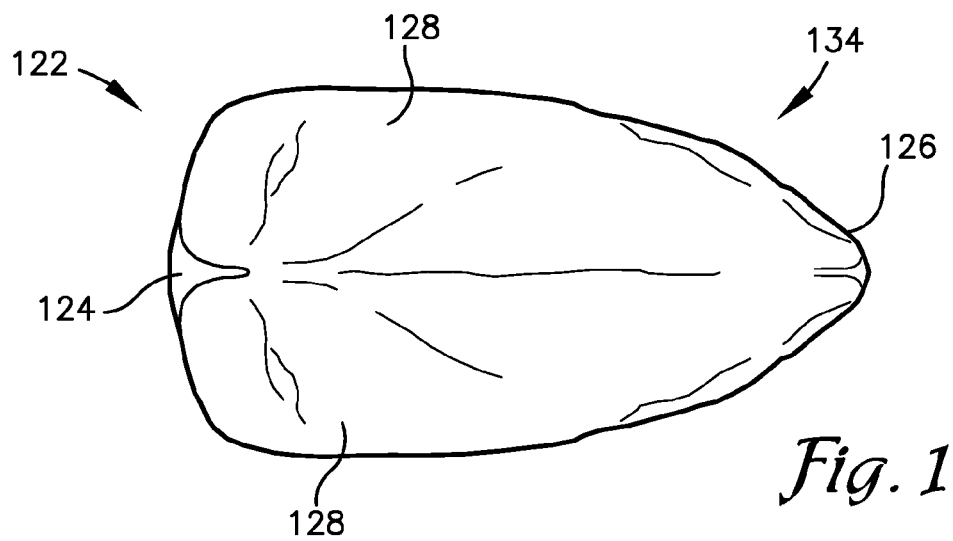
FIG. 1 is a ventral view of an exemplary bird carcass processed by the apparatus and method of the disclosed subject matter.
Figure 2:
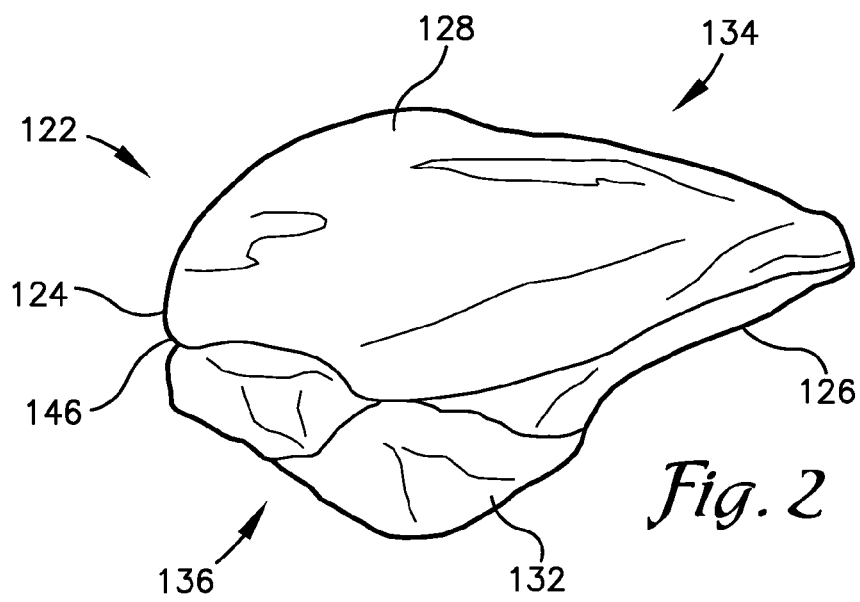
FIG. 2 is a side view of an exemplary bird carcass processed by the apparatus and method of the disclosed subject matter.
Figure 3:
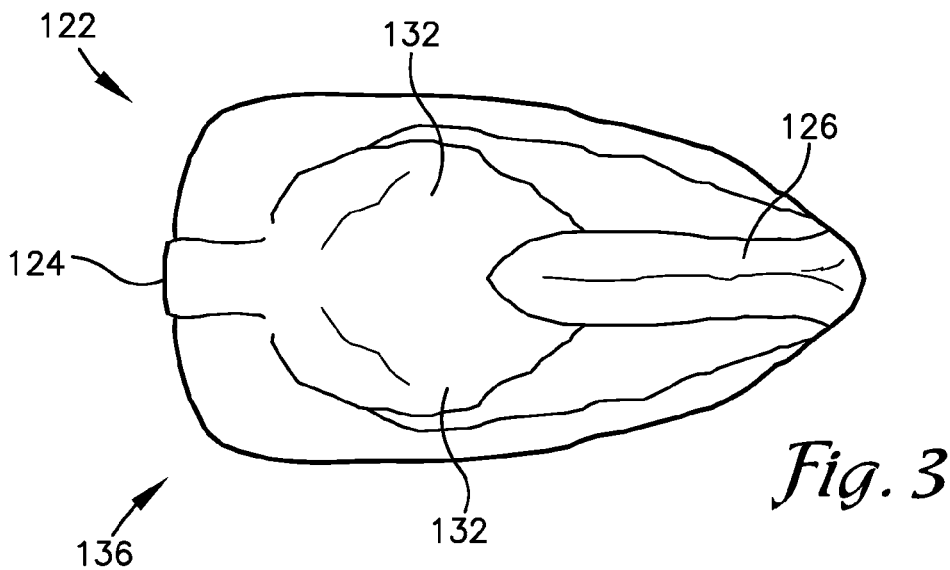
FIG. 3 is a dorsal view of an exemplary bird carcass processed by the apparatus and method of the disclosed subject matter.
Figure 4:
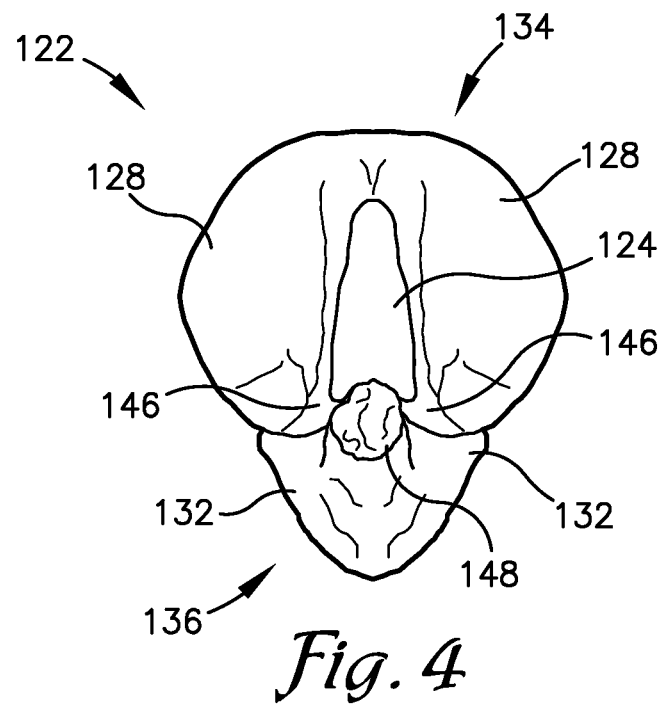
FIG. 4 is an anterior view of an exemplary bird carcass processed by the apparatus and method of the disclosed subject matter.
Figure 5:
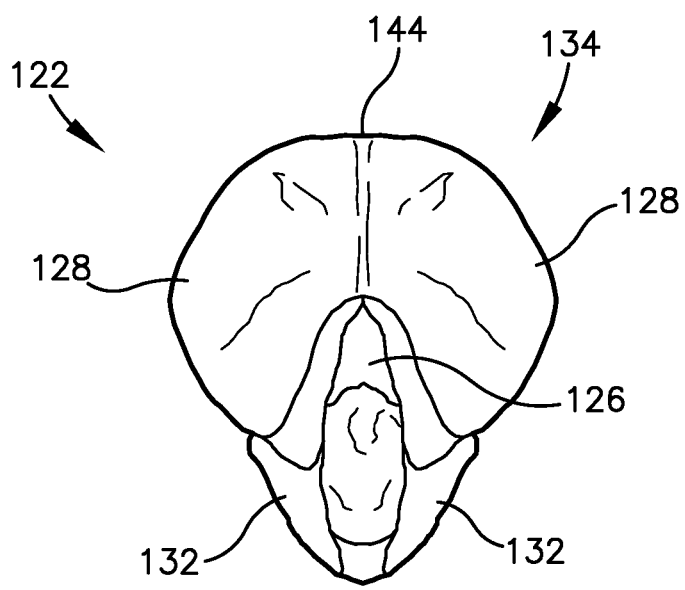
FIG. 5 is a posterior view of an exemplary bird carcass processed by the apparatus and method of the disclosed subject matter.
Figure 6:
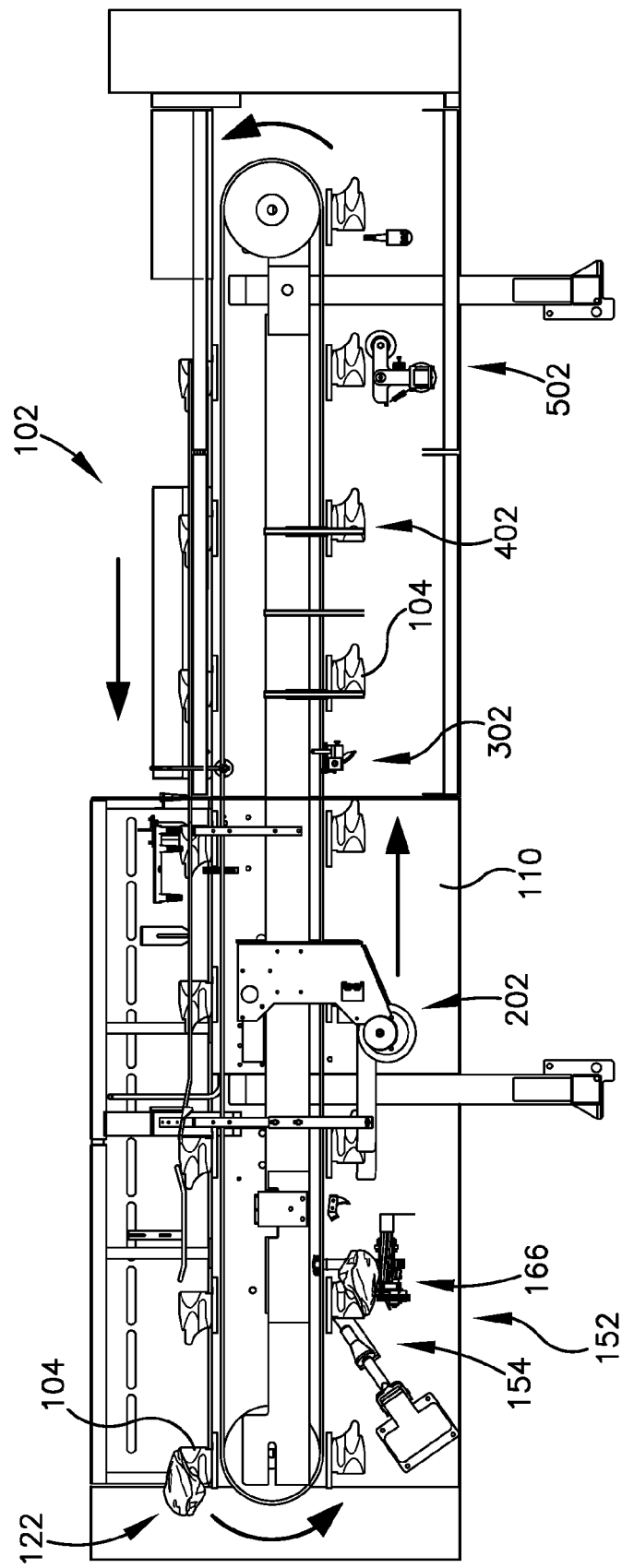
FIG. 6 is a side elevation view of an exemplary automated deboning apparatus embodying principles of the disclosed subject matter.

Referring to FIG. 6, reference numeral 102 generally designates an automated deboning apparatus embodying principles of the disclosed subject matter. The automated deboning apparatus 102 includes several processing stations, located about a housing 110, that mechanically remove wanted and unwanted tissues from an eviscerated bird carcass 122, and mechanically manipulate the tissues of the carcass 122 to maximize the yield of the tissues harvested from the carcass 122. The general process below may be described as skinning of the carcass 122 followed by tissue separation and deboning. Components of the carcass 122, including identification of the wanted tissues, will be presented first followed by a discussion of the mechanical manipulation of the tissues of the carcass 122 by the automated deboning apparatus 102 and manual manipulation and harvesting of the wanted tissues.

Referring to FIGS. 1-5, an exemplary bird carcass 122 is shown and described, and is commonly known as a chicken front half, without wings, with skin. As such, the carcass 122 is shown without the head and neck, wings, legs, and tail. Although a chicken is shown and described, it will be appreciated that various birds may be processed according to the disclosed subject matter. The carcass 122 extends between a neck opening 124 at the anterior end and a vent 126 at the posterior end, which generally defines an anterior-posterior axis. The carcass 122 has breast 128 tissue at a ventral end 134 and back meat 132 tissues at a dorsal end 136, which generally defines a ventral-dorsal axis. The carcass 122 shown has been eviscerated, and some skeletal material remains providing a support structure for the remaining tissues. The skeletal material remaining includes: a backbone 148 along the dorsal end 136; ribs 140 adjacent to the backbone 148, beneath the back meat 132 and adjacent the breast 120 and tenderloin 130; a wishbone 142; and breast bone 144 along the ventral end 134 beneath the breast 128 and tenderloin 130. The breast 128 is superficial to the tenderloin 130, and the tenderloin 130 is adjacent to the breast bone 144. Accordingly, the wanted tissues of the carcass 122 addressed herein include the back meat 132, breast 128, and tenderloin 130.

Figure 7:
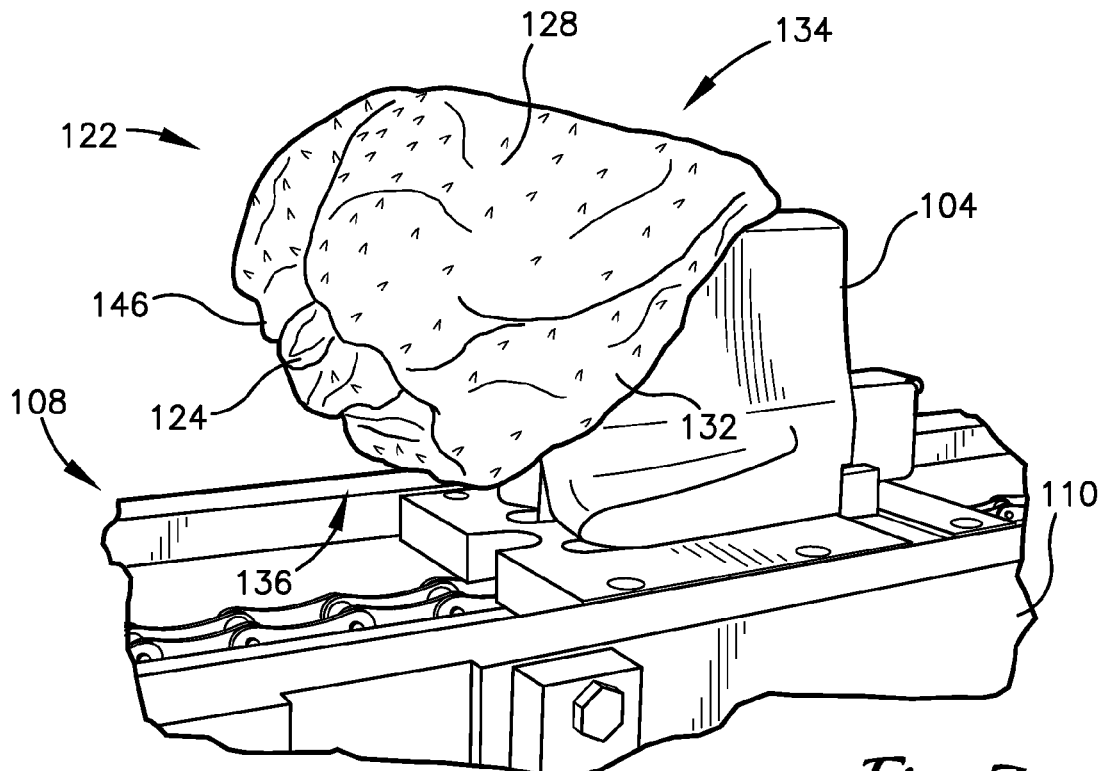
FIG. 7 is an isometric view from the front of a carcass, with skin, shown on a carcass mount of the exemplary automated deboning apparatus.

Referring to FIG. 7, the carcass 122 is shown on a carcass mount 104 connected to a conveyor system 108. A retention hook (not shown) at the front of the carcass mount 104 engages the internal body cavity of the carcass 122 to retain the carcass 122 on the carcass mount 104 during processing. The carcass 122 is advanced through each of the processing apparatuses below by the conveyor system 108. Because the carcass 122 has bilateral symmetry, the various processing apparatuses described below may be conducted on one side of the carcass 122 or on both sides of the carcass 122. In the automated deboning apparatus 102 shown in FIGS. 6-24, the carcass 122 is positioned so that the dorsal end 136 is facing the conveyor system 108 and the ventral end 134 is facing away from the conveyor system 108 so that the particular arrangement of the various processing apparatuses described below may operate on the carcass 122. It will be appreciated that the particular automated deboning apparatus 102 and the various processing apparatuses disclosed herein may be arranged in any number of different ways, and that operation of the various processing apparatuses upon the carcass 122 are not dependent upon their physical or special relationship to each other, rather, the results of the processing apparatuses are particular to their position relative to the carcass 122.

Figure 8:
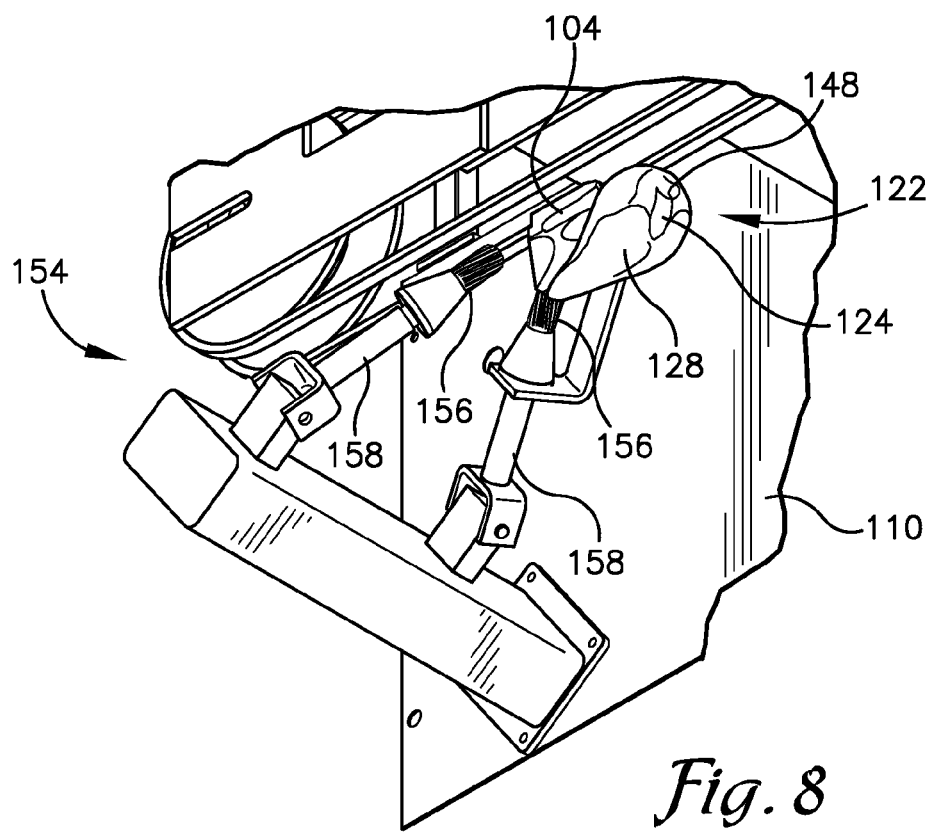
FIG. 8 is a perspective view from the front, of the back skin auger of the exemplary automated deboning apparatus.

Referring to FIG. 8, the carcass 122 first advances through a skin removal assembly 152. An irrigation system 112, such as the one shown in FIG. 10, expels fluid, including water, upon the carcass 122, and upon the processing apparatuses below throughout processing to cleanse the carcass 122 and processing apparatuses of loose tissue and debris. The skin removal assembly 152 includes a back skin auger 154 and a breast skin auger 166. Referring to FIG. 8, the carcass 122 is shown after advancing from left to right through the back skin auger 154. The back skin auger 154 includes a pair of parallel mesh gears 156 presenting a pinching surface for removing the skin from the dorsal end 136 of the carcass 122. The gears 156 are generally aligned at an oblique angle relative to the anterior-posterior axis of the carcass 122 and rotate on a mount 158 that is biased toward the carcass 122 by a biasing member including a spring. A power source is operably connected to and drives the gears 156.

Figure 9:
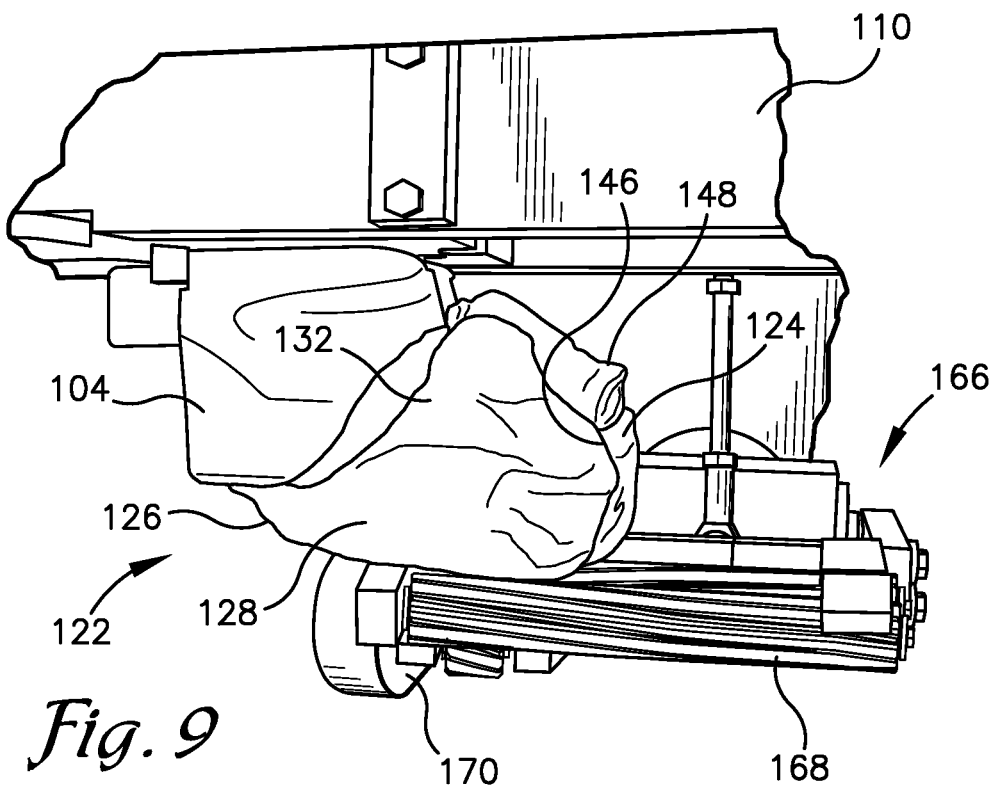
FIG. 9 is a perspective view from the front of the breast skin auger of the exemplary automated deboning apparatus.

Referring to FIG. 9, the carcass 122 is shown next advancing into engagement with the breast skin auger 166. The breast skin auger 166 includes a pair of parallel mesh gears 168 presenting a pinching surface for removing the skin from the ventral end 134 of the carcass 122. The gears 168 are generally aligned parallel to the anterior-posterior axis of the carcass 122, and rotate on a mount 170 that is biased toward the carcass 122 by a biasing member including a spring. A power source is operably connected to and drives the gears 168. Each of the back skin auger 154 and breast skin auger 166 are shown as a pair of meshed gears.

Figure 10:
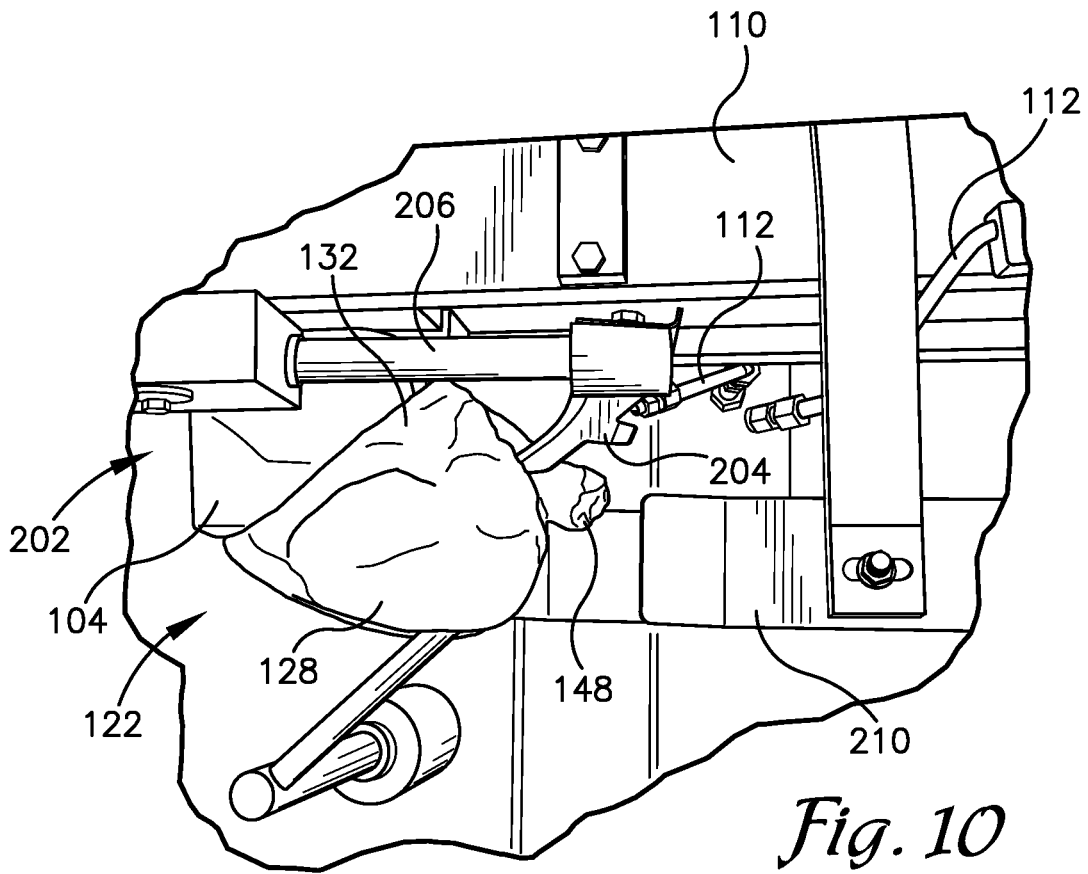
FIG. 10 is a perspective view from the front of the back meat removal assembly of the exemplary automated deboning apparatus.
Figure 11:
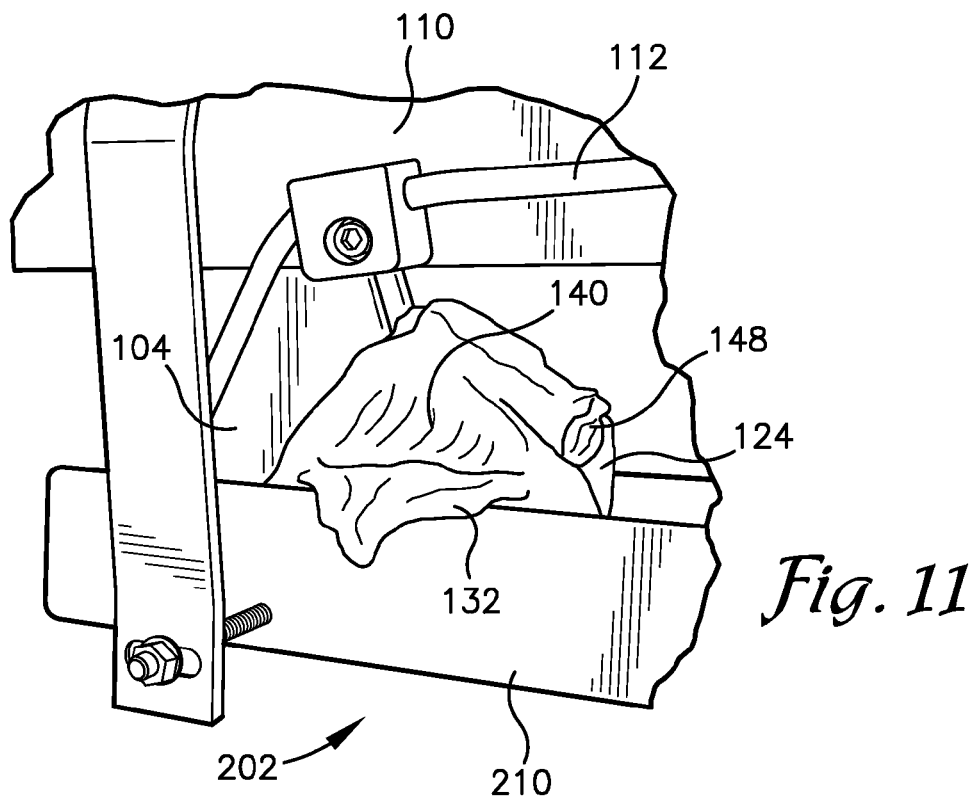
FIG. 11 is another perspective view from the front of a component of the back meat removal assembly of the exemplary automated deboning apparatus.
Figure 12:
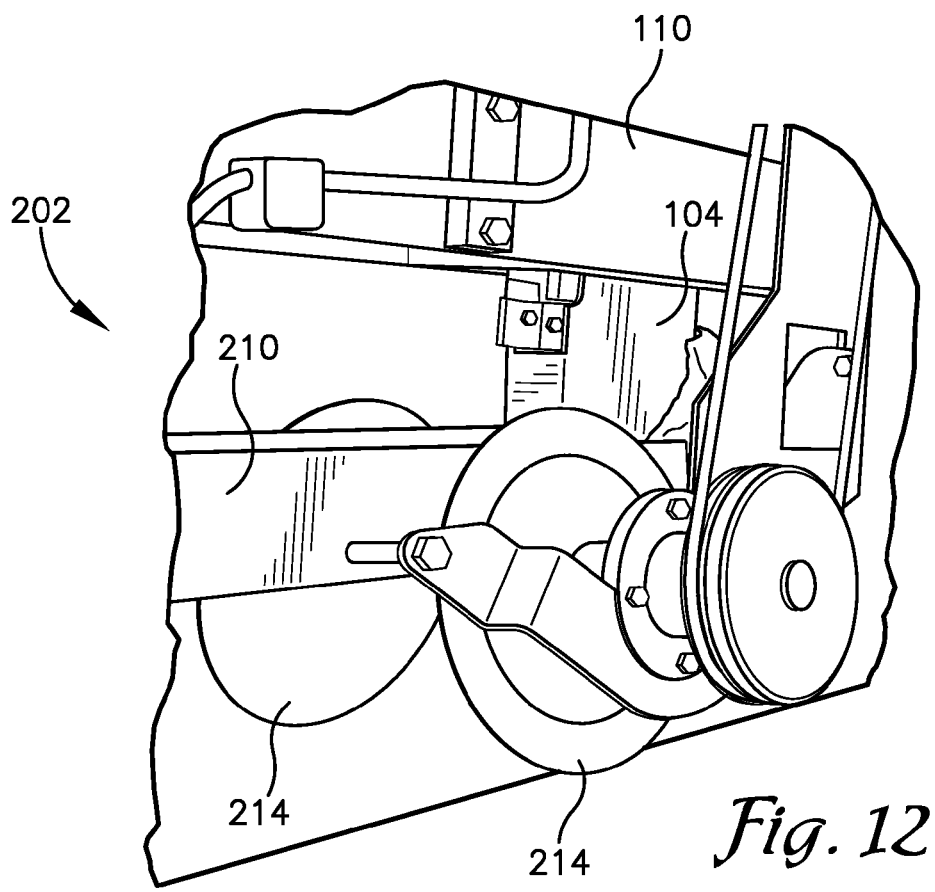
FIG. 12 is a perspective view from the back of a component of the back meat removal assembly of the exemplary automated deboning apparatus.

Referring to FIGS. 10-12, the carcass 122 is shown next advancing into engagement with a back meat removal assembly 202 for removal of the back meat 132 from the ribs 140. The back meat removal assembly 202 includes a scraper 204 connected to an arm 206. Each arm 206 is pivotally mounted to the housing 110. The arm 206 aligns the scraper 204 with the carcass 122 to scrape the back meat 132 from the ribs 140. Thereafter, the back meat 132 remains connected to the carcass 122 adjacent to the breast 128 tissue (FIG. 11). The back meat 132 is harvested from the carcass 122 by a blade 214. As the carcass 122 advances toward a support 210 with an adjacent rotating blade 214, the support 210 guides the back meat 132 into engagement with the rotating blade 214 whereby the back meat 132 is separated from the carcass 122 and is collected for further processing (FIGS. 11-12). The back meat removal assembly 202 is shown with a pair of scrapers 204 and a pair of blades 214.

Figure 13:
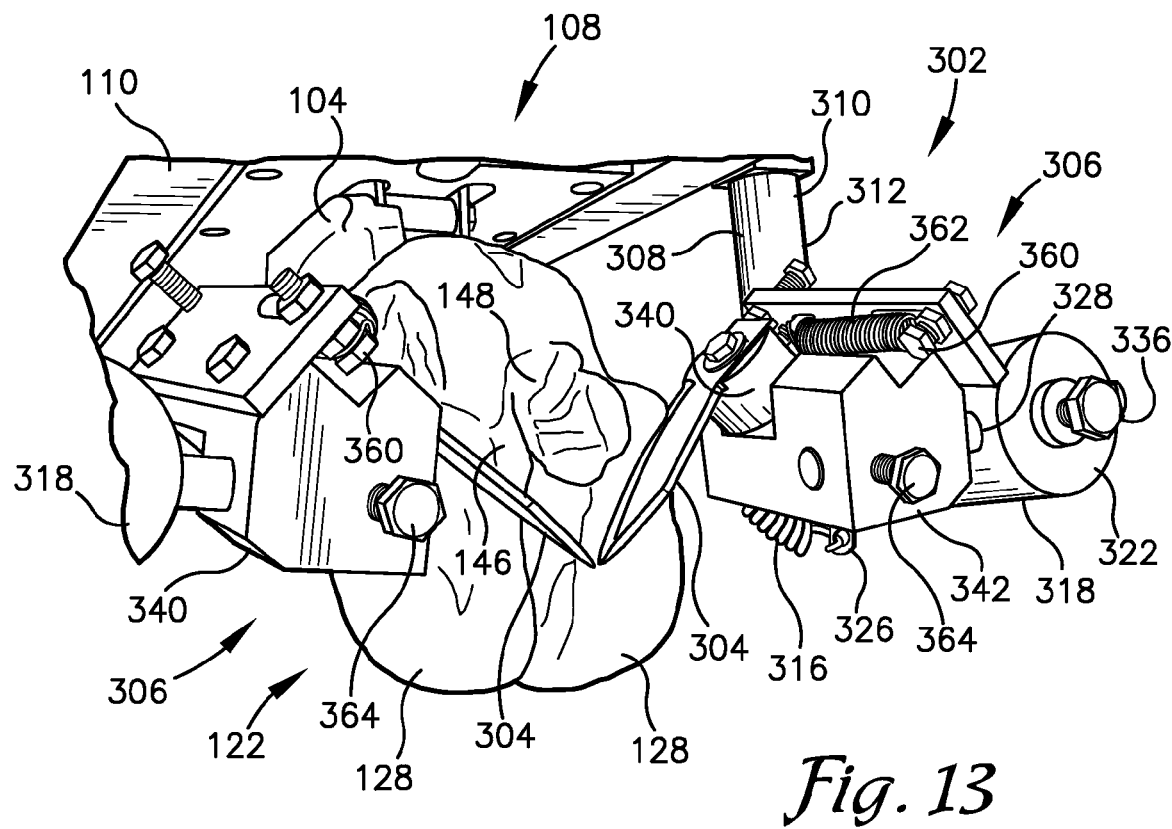
FIG. 13 is a perspective view from the front of the cut assembly of the exemplary automated deboning apparatus encountering a carcass.
Figure 14:
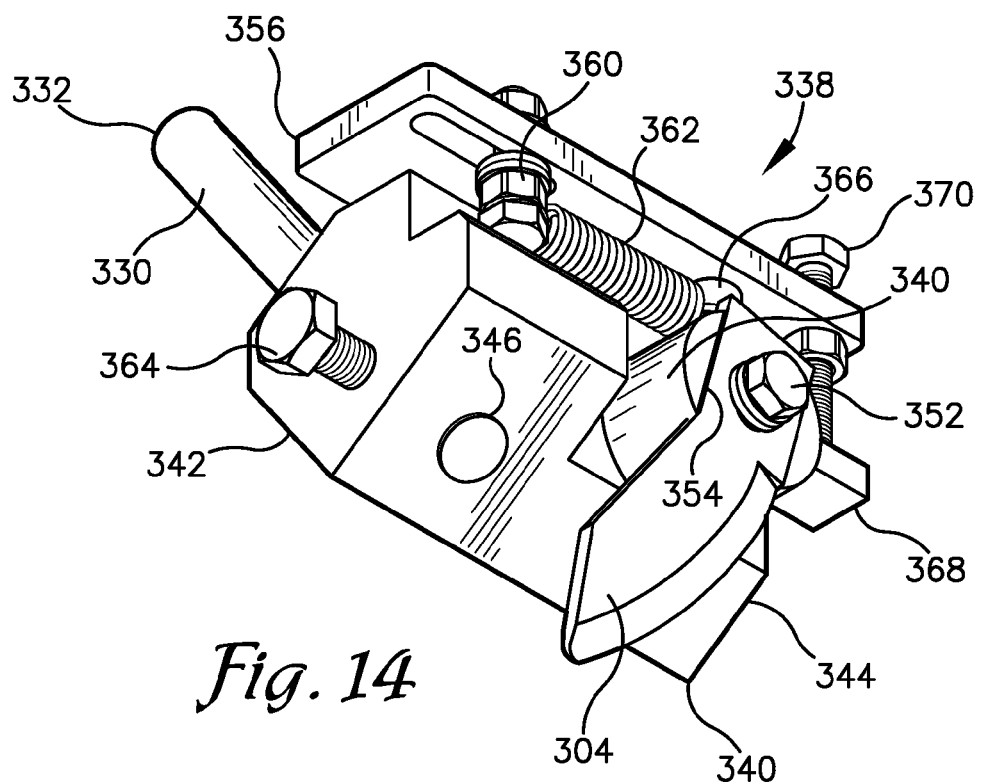
FIG. 14 is a perspective view of the cut assembly of the exemplary automated deboning apparatus.
Figure 15:
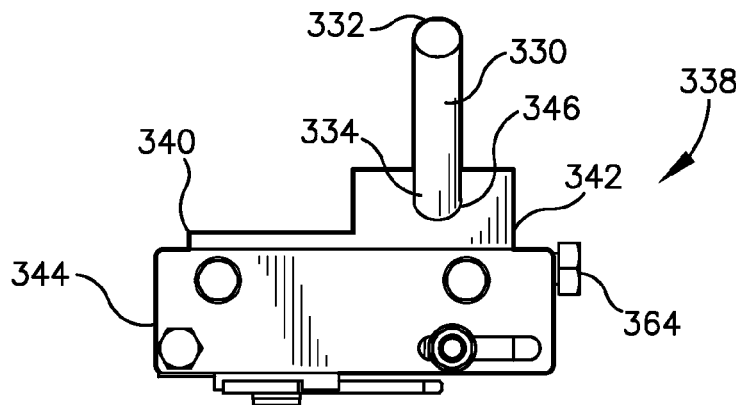
FIG. 15 is a top view of the cut assembly of the exemplary automated deboning apparatus.
Figures 16, 17:
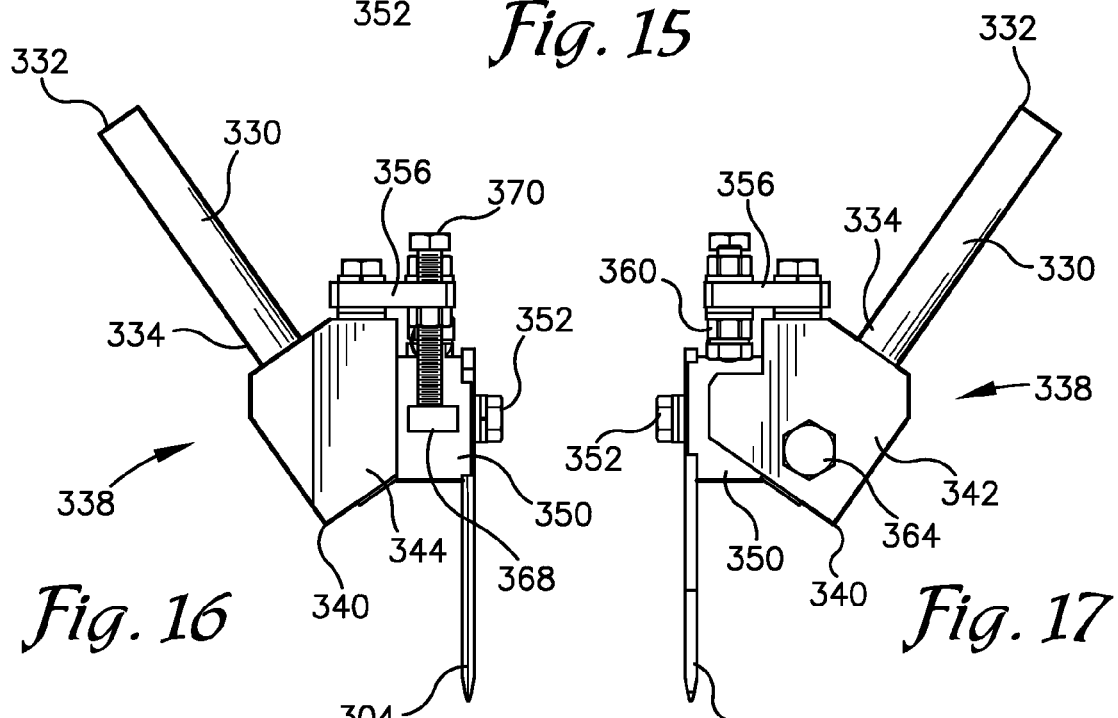
FIG. 16 is a rear view of the cut assembly of the exemplary automated deboning apparatus.
FIG. 17 is a front view of the cut assembly of the exemplary automated deboning apparatus.
Figure 18:
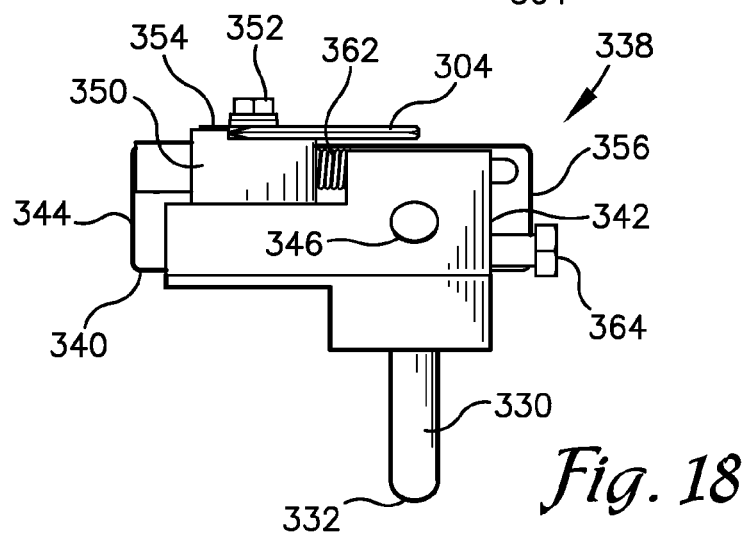
FIG. 18 is a bottom view of the cut assembly of the exemplary automated deboning apparatus.

Referring to FIG. 13, the carcass 122 is next advanced into engagement with a cut assembly 302. The cut assembly 302 mechanically manipulates the tissues of the carcass 122 by scoring the tissue, thereby facilitating subsequent mechanical and manual manipulation of the tissues. A cut assembly 302 is shown positioned on opposite lateral sides of the carcass 122. Each cut assembly 302 includes a blade 304 connected to a mount 306. The blade 304 is manufactured from a resilient material including stainless steel. The mount 306 may be a monolithic device connecting the blade 304 to the housing 110. Alternatively, the mount 306 is an articulated assembly capable of aligning, and biasing the blade 304 with the carcass 122 as it engages the tissues of the carcass 122. The articulated assembly generally includes an arm 318 connected to the housing 110 by a support 308, and connected to the blade 304 by a jig 338.

The support 308 is manufactured from a resilient material including stainless steel, and extends between a first end 310 and a second end 312. The first end 310 is connected to the housing 110, and the second end 312 is connected to the arm 318. The arm 318 is manufactured from a resilient material including nylon, and extends between a first end and a second end 322. The first end has an aperture for rotatably receiving the second end 312 of the support 308. An attachment at the second end 312 of the support 308, and an attachment 326 at the first end of the arm 318 are connected by a biasing member 316 including a spring, band, or other structure that provides biasing characteristics. The attachments are positioned whereby the biasing member 316 is under tension thereby causing the arm 318 to be biased inward toward the carcass 122 aligning the blade 304 with the carcass 122 and providing the blade 304 with a lateral force aiding the cutting of the tissue. Alternatively, the mount 306, or individually each support 308, may be biased by a biasing apparatus directly connected to the support 308, such as an actuator whereby the connection between the support 308 and arm 318 are fixed.

An extension 330 mounts the jig 338 inward of the arm 318. The extension 330 extends between a first end 332, received within an aperture 328 in the second end 322 of the arm 318, and a second end 334, received within an aperture 346 within the first end 342 of the body 340 of the jig 338. A fastener including a threaded member 336 releasably secures the first end 332 within the aperture 328, and a fastener including a threaded member 364 releasably secures the second end 334 within the aperture 346. Adjustment of the threaded members 336 and 364 allows the spacing between the arm 318 and jig 338 to be adjusted, and the vertical alignment of the jig 338 to be adjusted, for adjusting the alignment of the blade 304 with the carcass 122.

Referring to FIGS. 14-18, the jig 338 generally includes a body 340 and a blade mount 350. The body 340 is manufactured from a resilient material including nylon, and extends between a first end 342 and a second end 344. The blade mount 350 is located at the second end 344 and extends upward and inward toward the carcass 122 for mounting the blade 304 at an angle to the carcass 122. Positioning the blade 304 at an angle to the carcass 122 allows the blade 304 to cut the breast 128 tissue on the ventral side of the shoulder 146, and generally along the ventral side of the ribs 140 where the breast 128 attaches to the carcass 122. The blade 304 is releasably secured to the blade mount 350 by a fastener 352 including a threaded member. The forward edge of the blade 304 may rest against a stop 354 extending from the surface of the blade mount 350 thereby providing the blade 304 a surface to bias against when rotating with the blade mount 350. The fastener 352 extends through the blade mount 350 and is received within an aperture in the second end 344 thereby permitting the blade mount 350 to rotate about the fastener 352. In an embodiment, a bracket 356 secured to the body 340 provides an attachment 360 for an end of a biasing member 362. The opposite end of the biasing member 362 is attached to a fastener 366 adjustably connected to the blade mount 350. The biasing member 362 allows the blade 304 to rotate forward as it encounters the carcass 122, and applies pressure to the blade 304 for cutting the tissue. Adjusting the distance between the attachment 360 and the fastener 366 may vary the tension of the biasing member 362 upon the blade mount 350. Alternatively, the biasing member 362 may include a band or other structure that provides biasing characteristics. A stop 368 on the blade mount 350 allows the angle of the blade 304 to be adjusted by a threaded fastener 370. The fastener 370 extends from the bracket 356 allowing adjustment of the blade 304 position.

In use, the mount 306 aligns the blade 304 with the advancing carcass 122 so that a cut or score is made in the tissue beginning generally at a point outside and below the shoulder 146, and generally outside and below the upward arms of the wishbone 142. The cut then extends toward the posterior end of the carcass 122 as the blade 304 travels laterally along the length of the carcass 122 generally on the ventral side of the ribs 140. The cut terminates generally adjacent the posterior end of the carcass 122 as the carcass 122 exits the cut assembly 302. The cut at the point outside and below the shoulder 146, and outside and below the upward arms of the wishbone 142 facilitate removal of the breast 128 tissue and tenderloin 130 tissue during manual harvesting of the wanted tissues described in more detail below. As with the processing apparatuses above, a pair of cut assemblies 302 are shown.

Figure 19:
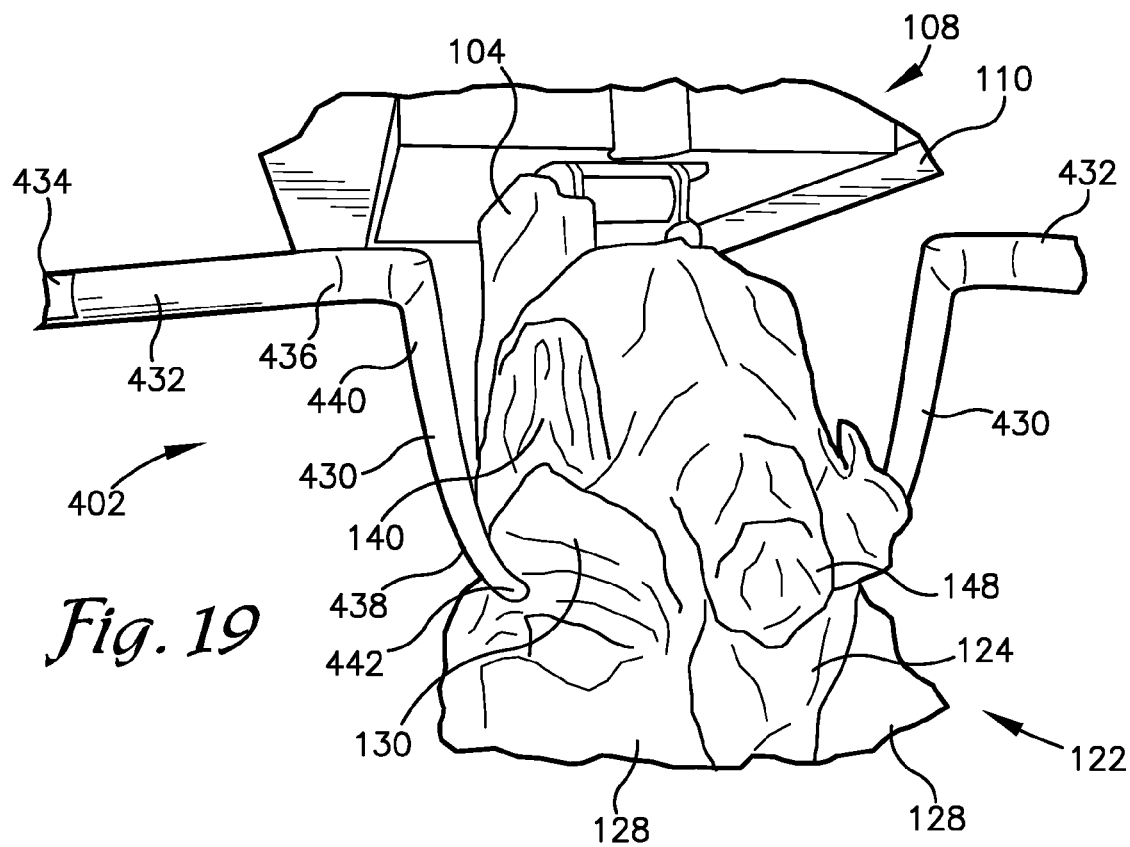
FIG. 19 is a perspective view from the front of the scraper assembly of the exemplary automated deboning apparatus.
Figure 20:
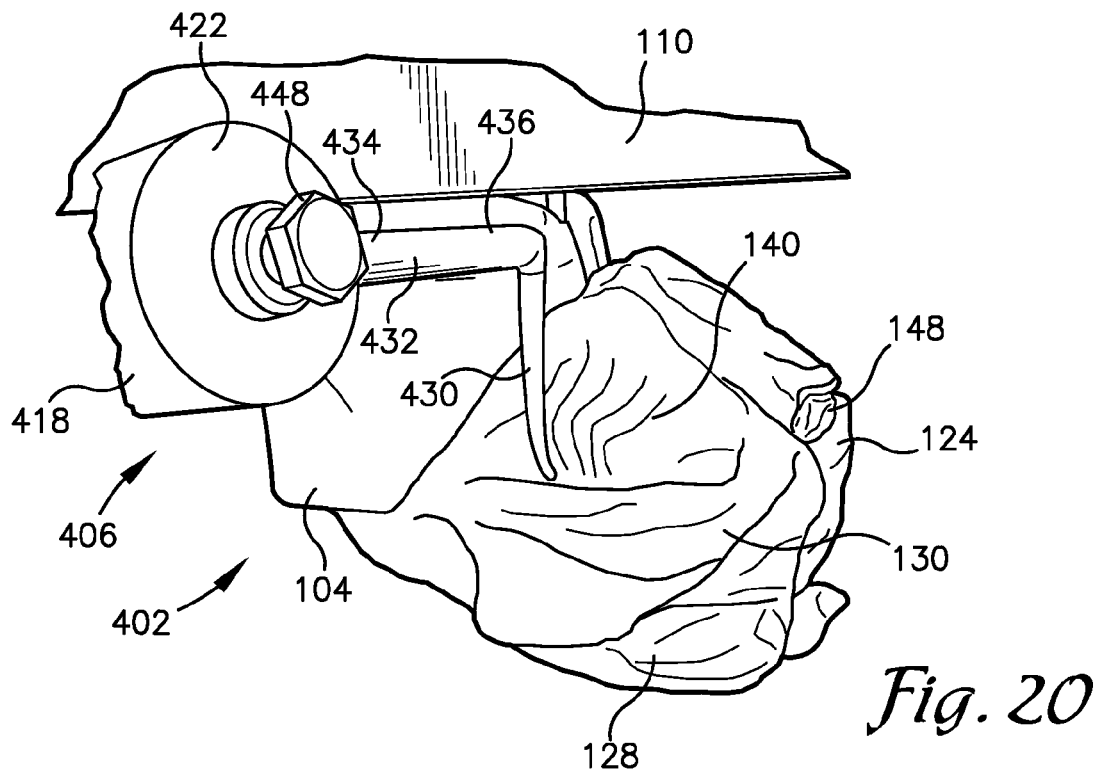
FIG. 20 is a perspective view from the front of the scraper assembly of the exemplary automated deboning apparatus.

Referring to FIGS. 19-20, the carcass 122 is next advanced into engagement with a scraper assembly 402. The scraper assembly 402 has a tool 430 that generally conforms to the side profile of the carcass mount 104. The scraper assembly 402 mechanically manipulates the tissues of the carcass 122 as the carcass 122 is advanced into the tool 430 causing the tool 430 to pass through the connective tissue holding the breast 128 tissue to the tenderloin 130 tissue, and the breast 128 tissue to the skeleton, partially separating the breast 128 tissue from the tenderloin 130 and skeleton, and thereby facilitating subsequent mechanical and manual manipulation of the tissues. Two scraper assemblies 402 are shown positioned on opposite lateral sides of the carcass 122.

Each scraper assembly 402 includes a tool 430 with a curved member 438 connected to a mount 406. The mount 406 generally includes an arm 418, connected to the housing 110 by a support. The support is manufactured from a resilient material including stainless steel, and extends between a first end and a second end. The first end is connected to the housing 110, and the second end is connected to the first end of the arm 418. The arm is manufactured from a resilient material including nylon, and extends between a first end and a second end 422. The first end has an aperture for receiving the second end of the support. An attachment at the second end of the support, and an attachment at the first end of the arm 418 are connected by a biasing member including a spring, band, or other structure that provides biasing characteristics. The attachments are positioned whereby the biasing member is under tension thereby causing the arm 418 to be biased inward toward the carcass 122 aligning the curved member 438 with the carcass 122 and providing the curved member 438 with a lateral force aiding the scraping of the tissue. Alternatively, the support may be biased by a biasing apparatus directly connected to the support such as an actuator.

An elongated body 432 mounts the tool 430 inward of the arm 418. The body 432 extends between a first end 434, received within an aperture in the second end 422 of the arm 418, and a second end 436. A fastener including a threaded member 448 releasable secures the first end 434 within the aperture. Adjustment of the threaded member 448 allows the spacing between the curved member 438 and the carcass 122 to be adjusted. The curved member 438 extends between a first end 440, connected to the second end 436 of the body 432, and a second end 442.

Figure 21:
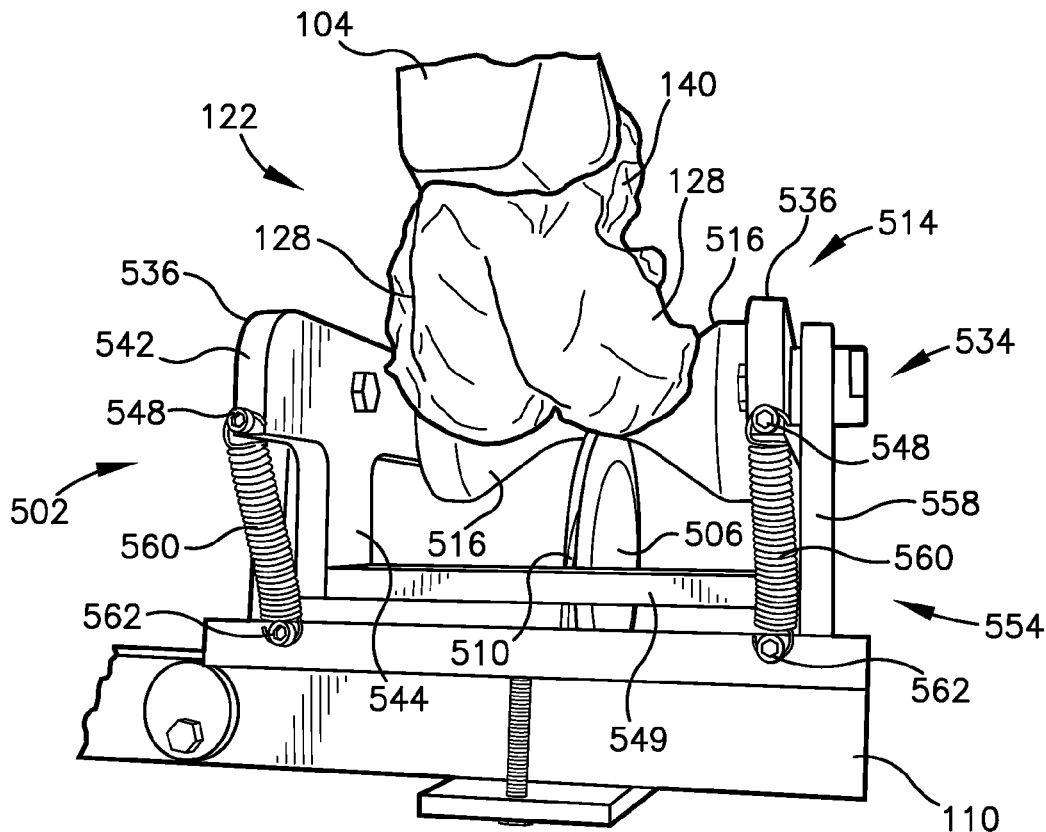
FIG. 21 is a perspective view from the rear of the separator assembly of the exemplary automated deboning apparatus.
Figure 22:
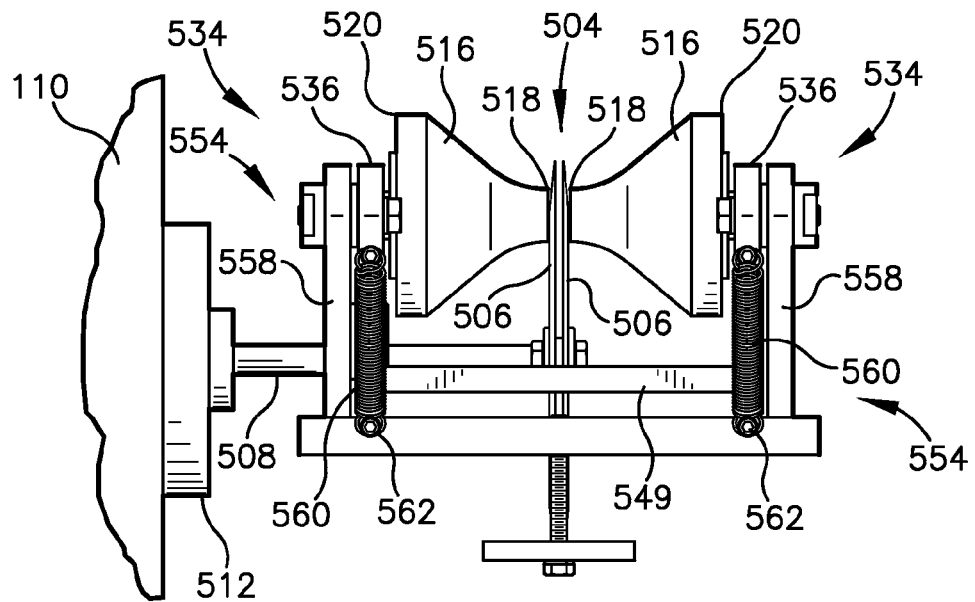
FIG. 22 is a rear elevation view of the separator assembly of the exemplary automated deboning apparatus.
Figure 23:
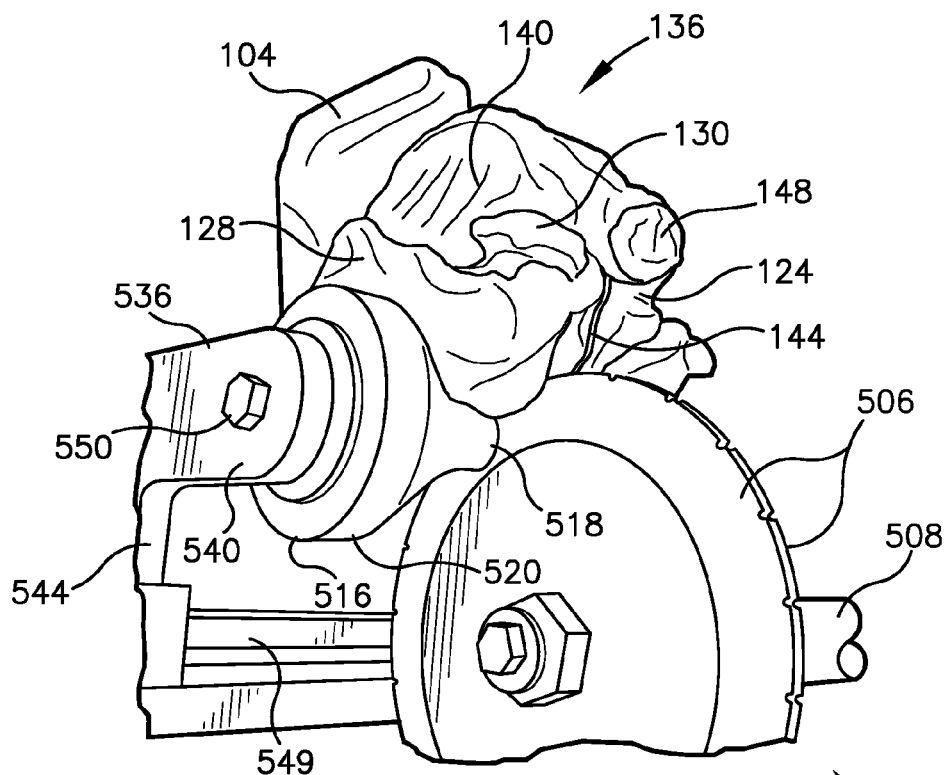
FIG. 23 is a perspective view from the front of the separator assembly of the exemplary automated deboning apparatus.
Figure 24:
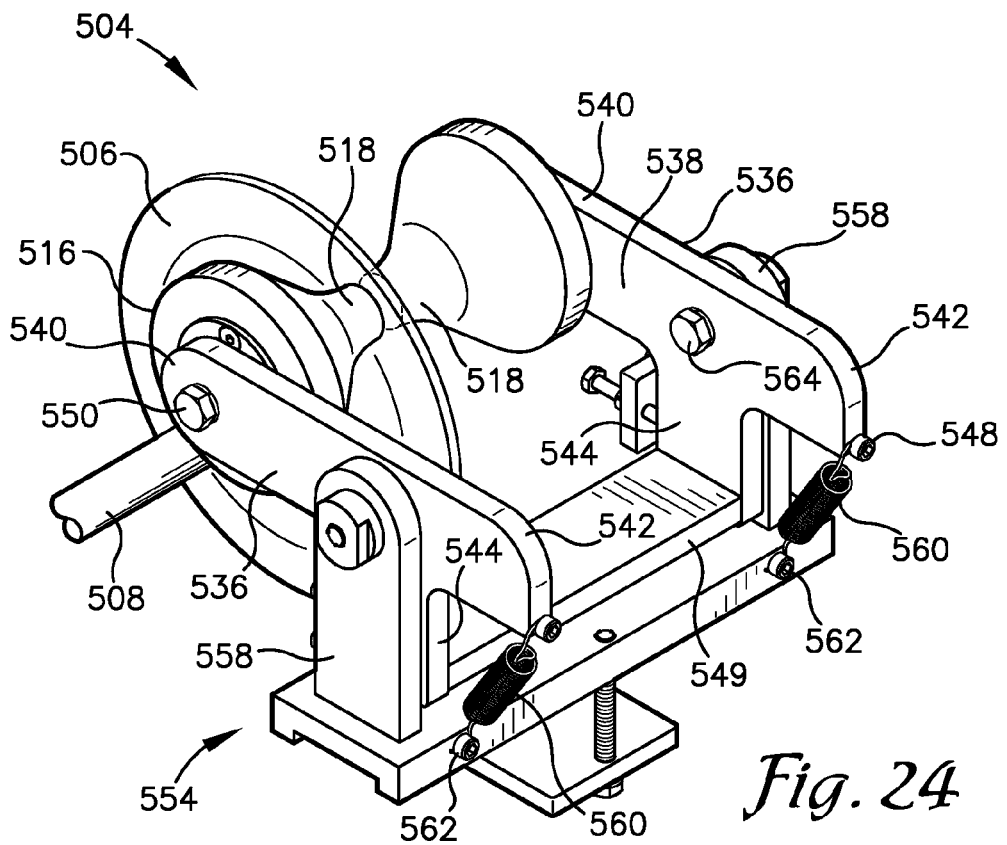
FIG. 24 is a perspective view from the rear of the separator assembly of the exemplary automated deboning apparatus.

Referring to FIG. 21, the carcass 122 is next advanced into engagement with a separator assembly 502. The separator assembly 502 mechanically manipulates the tissues of the carcass 122 by cradling the breast 128 tissue with a guide assembly 514 as a blade assembly 504 separates the breast 128 tissue and tenderloin 130 tissue from the breast bone 144, thereby facilitating subsequent manual manipulation of the tissues.

The guide assembly 514 generally includes opposing, spaced apart rollers 516 rotatably connected to a mount 534. The rollers 516 center the carcass 122 with the blade assembly 504, and support the breast 128 tissues from the ventral end 134 and sides biasing the tissues toward the carcass 122. The rollers 516 are manufactured from a resilient material including nylon, and taper inward from a relatively wide base 520 to a relatively narrow tip 518, and when positioned tip-to-tip provide a general U-shaped concave contact surface (FIG. 22) for supporting the carcass 122. The spaced relationship of the rollers 516 allow the blades 506, discussed further below, to pass between the tips 518 of the rollers 516.

The mount 534 includes a pair of spaced apart arms 536 having a general T-shaped configuration that are pivotally connected to the housing 110 by a bracket 554. The arms 536 are manufactured from a resilient material including stainless steel. Each arm 536 has a lateral member 538 extending from a first end 540 to a second end 542, and a vertical member 544 depending therefrom. An aperture at the first end 540 receives a fastener 550 for mounting the roller 516. A pair of braces 558 extends from the housing 110 for pivotally connecting the mount 534 thereto. Each arm 536 is connected to a brace 558 by a fastener 564 received within an aperture in the arm 536 and an aperture in the brace 558. A brace 549 mounted to, and extending between the vertical members 544 adds structural support to the mount 534 and allows the rollers 516 to move together. A biasing member 560, including a spring, is connected at one end to an attachment 548 on the second end 542 of the lateral member 538, and at a second end to an attachment 562 on the housing. The biasing members 560 bias the breast 128 tissue and tenderloin 130 tissue toward the carcass 122, and supports the carcass 122 as the blade assembly 504 partially separates the breast 128 tissue and tenderloin 130 tissue from the breast bone 144. Alternatively, the biasing member 560 may include a band, actuator, or other structure that provides biasing characteristics. In another alternative embodiment, the arms 536 are not connected by a brace 549, thereby allowing each arm 536 to be biased independently, thereby allowing the rollers 516 to move independently permitting greater control over the orientation of the carcass 122 as it is cut by the blade assembly 504.

The blade assembly 504 generally includes adjacent blades 506 that are spaced apart sufficiently to pass the breast bone 144 between them and to cut the tissue along each side of the breast bone 144. In an embodiment the blades 506 are circular and are mounted to a shaft 508 rotated by a power source 512. The blades 506 are manufactured from a resilient material including stainless steel. A spacer 510 extends between the blades 506 providing surface for removed tissues and debris to be discharged from between the blades 506. The spacer 510 may be manufactured from a resilient material including nylon. In an alternative embodiment of the blade assembly 504 may be independently moved toward or away from the carcass 122 allowing control over the depth the blades 506 cut the tissues.

As the carcass 122 is advanced into engagement with the guide assembly 514, the U-shaped guide (FIG. 22) created by the rollers 516 centers and supports the carcass 122 as the blades 506 partially separate the breast 128 tissue and tenderloin 130 tissue from the beast bone 144 along the ventral end 134. After passing through the separator assembly 502, the breast 128 tissue remains connected to the carcass 122 generally near the neck opening 124 between the shoulder 146 and the forward area of the breast bone 144, and generally near the vent 126 in an area between the ribs 140 and the rear area of the breast bone 144. The tenderloin 130 tissue generally remains connected to the carcass 122 along its surface that is medial and superficial to the breast bone 144. After mechanical manipulation of the tissues by the processing apparatuses above, the resulting pre-cut carcass 122 is still a single carcass but with the wanted tissues mechanically manipulated and prepared for expedited manual manipulation or harvesting. As such, the carcass 122 is disengaged from the carcass mount 104 and transferred to a fixture 602 for harvesting of the wanted tissues.

The various articulated and biased structures of the back meat removal assembly 202, cut assembly 302, scraper assembly 402, and separator assembly 502 may be controlled independently and automatically during use to adjust to carcasses 122 of differing dimensions and orientations thereby maximizing the tissue yield from the carcass, and minimizing incorporation of unwanted tissues or bones. The independent and automatic control may be facilitated by a microcontroller receiving input signals from sensors that detect the dimensions and orientation of the carcass 122, and sending output signals to actuators connected to the articulated and biased structures to position the processing apparatuses.

Figure 25:
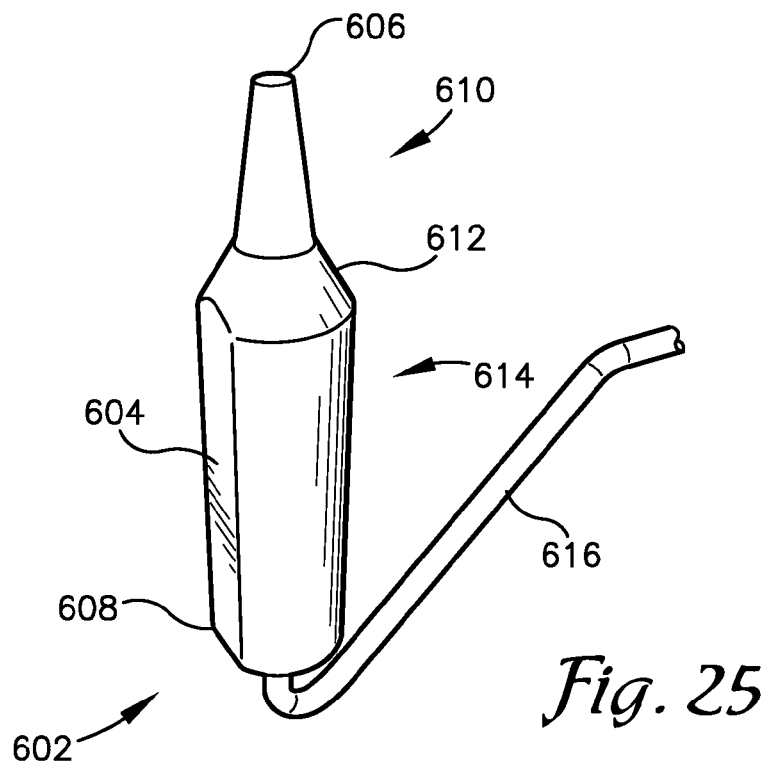
FIG. 25 is a perspective view from the front of a fixture of the exemplary manual tissue harvesting apparatus and method of the disclosed subject matter.

Referring to FIGS. 26-29, the carcass 122 is shown on a fixture 602 for manual harvesting. Referring to FIG. 25, the fixture 602 includes an elongated body 614 attached to a support 616. The body 614 is manufactured from a resilient material including nylon, and the support 616 is manufactured from metal including stainless steel. In an embodiment, the fixture 602 may include a securing structure (not shown) including a hook or the physical structure of the fixture 602, for engaging the internal body cavity of the carcass 122 to retain the carcass 122 on the fixture 602 during manual harvesting. The body 614 extends between a first end 606 and a second end 608. The first end 606 comprises a steep cone 610 with a cross sectional area generally less than the neck opening 124 of the carcass 122. The second end 608 generally comprises a cylinder 604 with a cross sectional area generally less than the internal cavity of the carcass 122 but greater than the neck opening 124. Between the cone 610 and the cylinder 604 is a transition 612 that tapers from a narrow cross sectional area at the cone 610 to a wide cross sectional area at the cylinder 604. The transition 612 prevents the carcass 122 from sliding toward the second end 608 when the breast 128 and tenderloin 130 are harvested on the fixture 602. The support 616 is an elongated member that extends into the second end 608 of the body 604, provides structural support to the fixture 602, and permits secure attachment of the fixture 602 to an object, such as a work station.

The cuts made by the cut assembly 302 and the separator assembly 502 above facilitate removal or hand harvesting of the breast 128 tissue and tenderloin 130 tissue because they have mechanically started removal of the tissues before they are manually removed by an operator. The operator completes removal of the wanted tissues from the carcass 122 by tearing the breast 128 tissue and tenderloin 130 tissues from the carcass 122.

Figure 26:
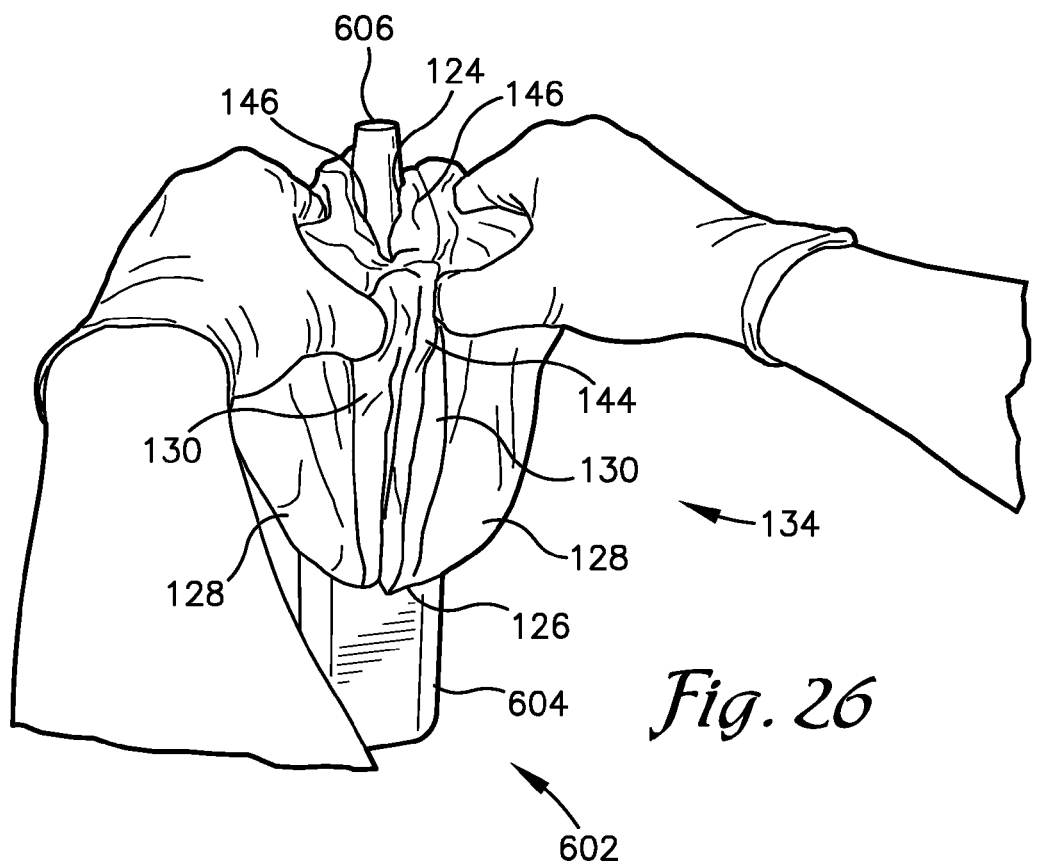
FIG. 26 is a perspective view from the front of the manual harvesting of the breast tissue of a carcass on a fixture according to an embodiment of the exemplary manual tissue harvesting apparatus and method.
Figure 27:
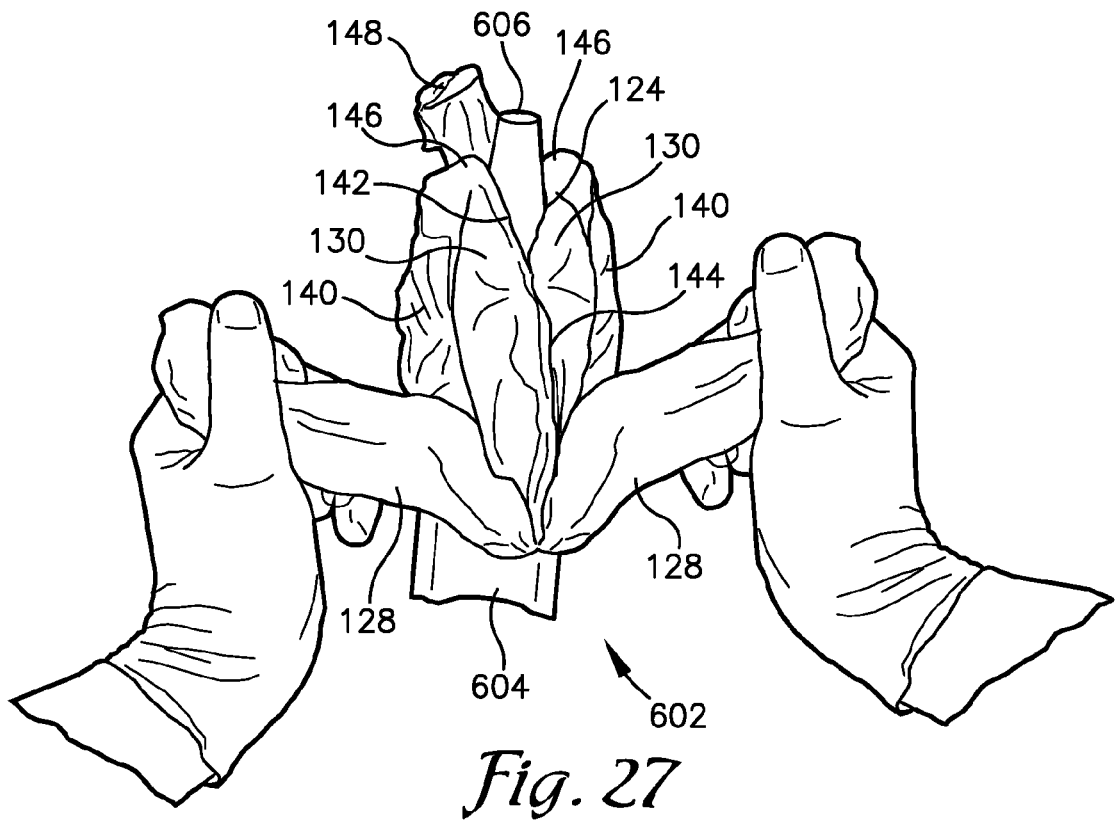
FIG. 27 is a perspective view of the manual harvesting of the breast tissue of a carcass on a fixture according to an embodiment of the exemplary manual tissue harvesting apparatus and method.
Figure 28:
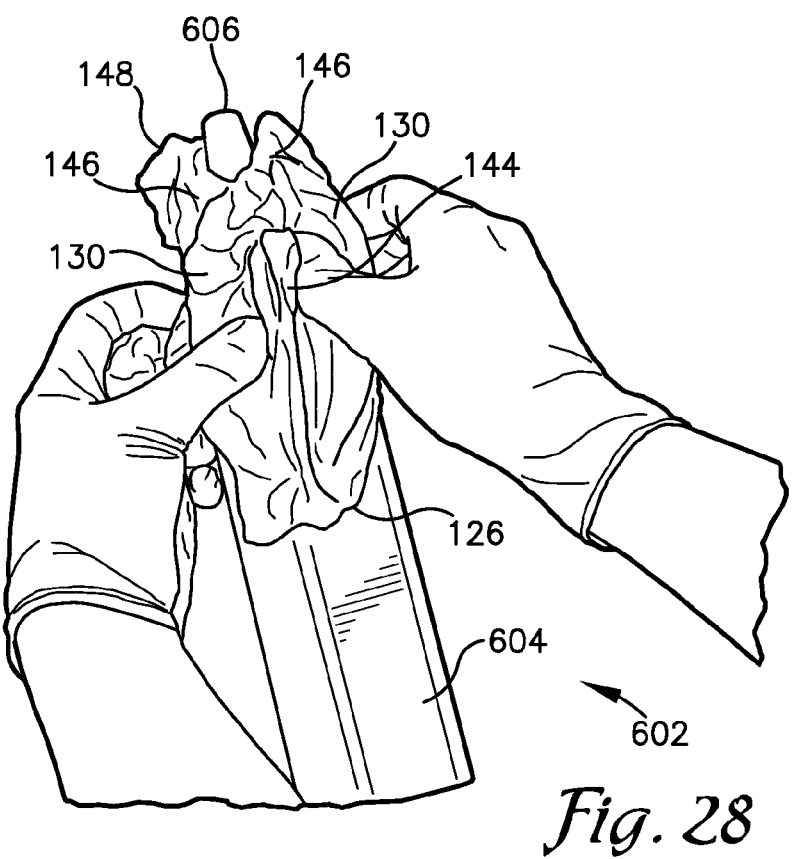
FIG. 28 is a perspective view from the front of the manual harvesting of the tenderloin tissue of a carcass on a fixture according to an embodiment of the exemplary manual tissue harvesting apparatus and method.
Figure 29:
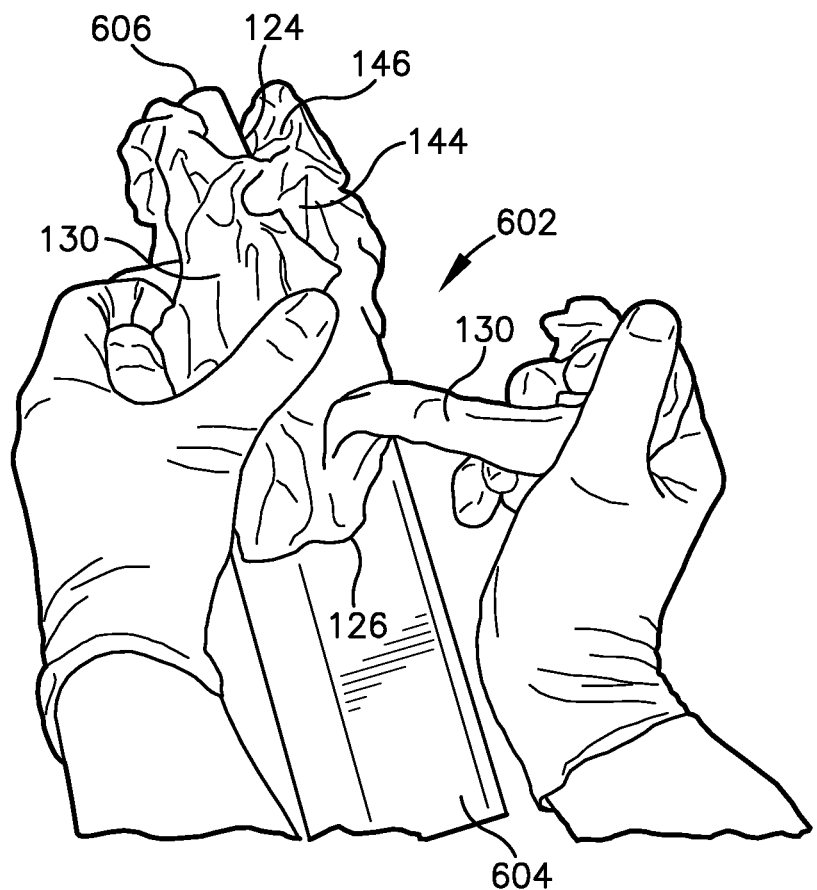
FIG. 29 is a perspective view from the front of the manual harvesting of the tenderloin tissue of a carcass on a fixture according to an embodiment of the exemplary manual tissue harvesting apparatus and method.
Figure 30:
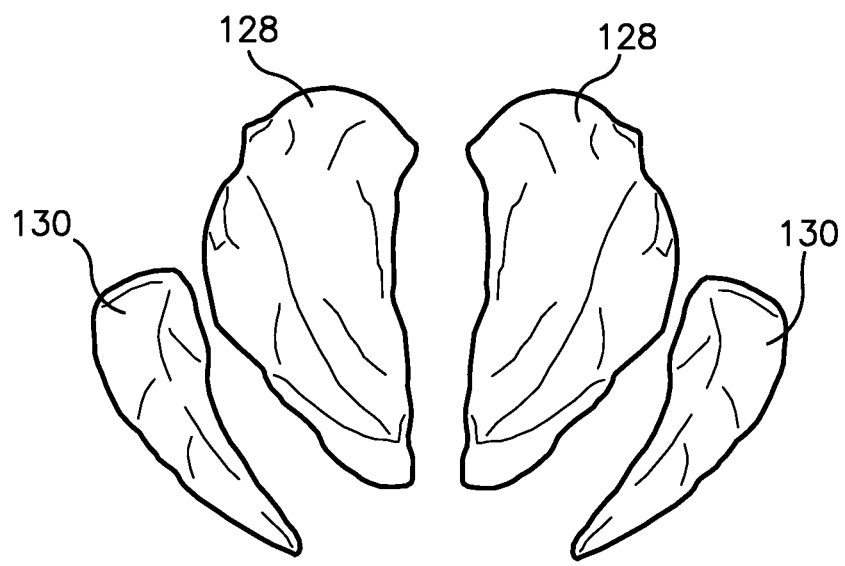
FIG. 30 is a view of the breast tissue and tenderloin tissue harvested from a carcass using a fixture according to an embodiment of the exemplary manual tissue harvesting apparatus and method.

Referring to FIG. 26, the body 614 of the fixture 602 is orientated generally vertical, and the carcass 122 is placed on the fixture 602 by positioning the vent 126 over the first end 606 and positioning the cone 610 within the neck opening 124. The fixture 602 may be positioned in a variety of orientations that are comfortable for the operator. The operator orientates the carcass 122 with the ventral end 134 facing them, the heels of their hands orientated toward the vent 126 and facing the carcass 122, and the thumbs on opposite sides of the breast bone 144 extending toward the neck opening 124. The operator's fingers are placed near the top of the breast 128 tissue proximal to the shoulder 146. Because the blade 304 of the cut assembly 302 has cut the breast 128 tissue longitudinally along the length of the carcass 122, and the blades 506 of the separator assembly 502 have separated the breast 128 tissue and tenderloin 130 tissue from the ventral end 134 along the breast bone 144, the breast 128 tissue remains connected to the carcass 122 generally by connective tissue in an area between the cuts and between the breast 128 tissue and tenderloin 130 tissue by the fascia.

An operator may manually manipulate and remove the breast 128 tissues from the carcass 122 by extending the other digits of the hand around the carcass 122 toward the dorsal end 136, pinching a finger and thumb together, into generally a circle, grasping the breast 128 tissue with the fingers (FIG.

26), moving the hands down and away from the carcass 122 toward the vent 126 (FIG. 27), thereby separating the breast 128 tissue from the carcass 122. Accordingly, the breast 128 tissue is thereby torn from the carcass 122 beginning near the neck opening 124, down along the tenderloin 130 tissue, and ending near the vent 126. Once the breast 128 tissue is removed, the operator may then harvest the tenderloin 130 tissue in a similar manner by drawing the thumb between the breast bone 144 and tenderloin 130 tissue near the neck opening 124, pinching a finger and thumb together, grasping the tenderloin 130 tissue (FIG. 28), moving the hands down and away from the carcass 122 toward the vent 126 (FIG. 29), thereby separating the tenderloin 130 tissue from the carcass 122.

Mechanically manipulating the tissues as described above prepares the wanted tissues for manual harvesting by hand without the use of tools or knives. A knife may be used by an operator during hand harvesting to assist in detaching the wanted tissues from the carcass 122 or to remove any remaining unwanted tissues or bones from the wanted tissues. Manually harvesting the wanted tissues by hand allows any unwanted tissues or bones to be observed by the operator, and removed by the operator, thereby increasing the yield of wanted tissues from the carcass 122.

In an alternative embodiment, manual harvesting of the wanted tissues from the skinless carcass 122 yields a breast tissue 128 butterfly fillet 728 with the back meat 132 attached to the breast tissue 128. The breast tissue 128 butterfly fillet 728 with back meat 132 attached may be harvested from a carcass 122 that only encounters the scrapper 204 and cut assembly 302, and that does not encounter the blade 214 or separator assembly 502.

After the skinless carcass 122 encounters the scraper 204 and cut assembly 302, the pre-cut carcass 122 is advanced to a manual tissue harvesting location. In an embodiment, the carcass 122 remains on the carcass mount 104. In an embodiment, the carcass 122 is transferred to the mount 534. If the carcass 122 remains on the carcass mount 104, it advances along the conveyor system 108 to a location whereby the carcass mount 104 is repositioned, either mechanically or manually, to orientate the neck opening 124 upward, and the dorsal end 136 toward an operator. Each breast tissue 128 half is connected along the ventral end 134 adjacent the breast bone 144. The back meat 132 remains connected to the breast tissue 128, but it is separated from the ribs 140. Because the blade 304 of the cut assembly 302 has cut the breast 128 tissue longitudinally along the length of the carcass 122, the breast 128 tissue remains connected to the carcass 122 generally by connective tissue in an area along the breast bone 144, and to the tenderloin 130 tissue by the fascia.

Figure 31:
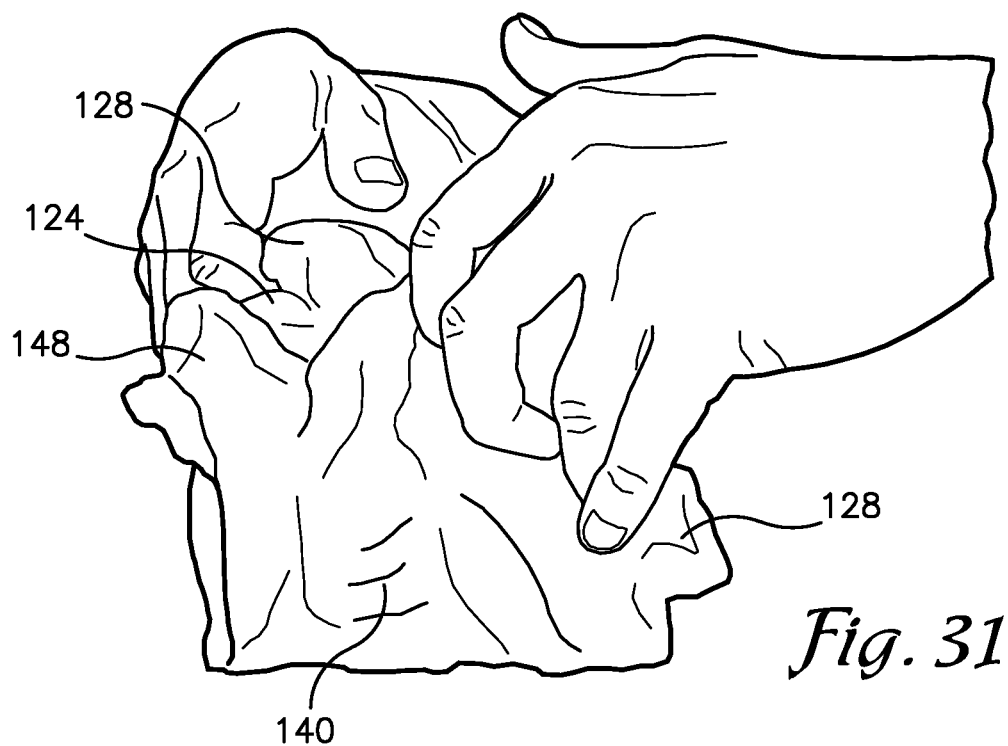
FIG. 31 is a perspective view from the back of the manual harvesting of the breast tissue butterfly fillet of a carcass on a fixture according to an embodiment of the exemplary manual tissue harvesting apparatus and method.
Figure 32:
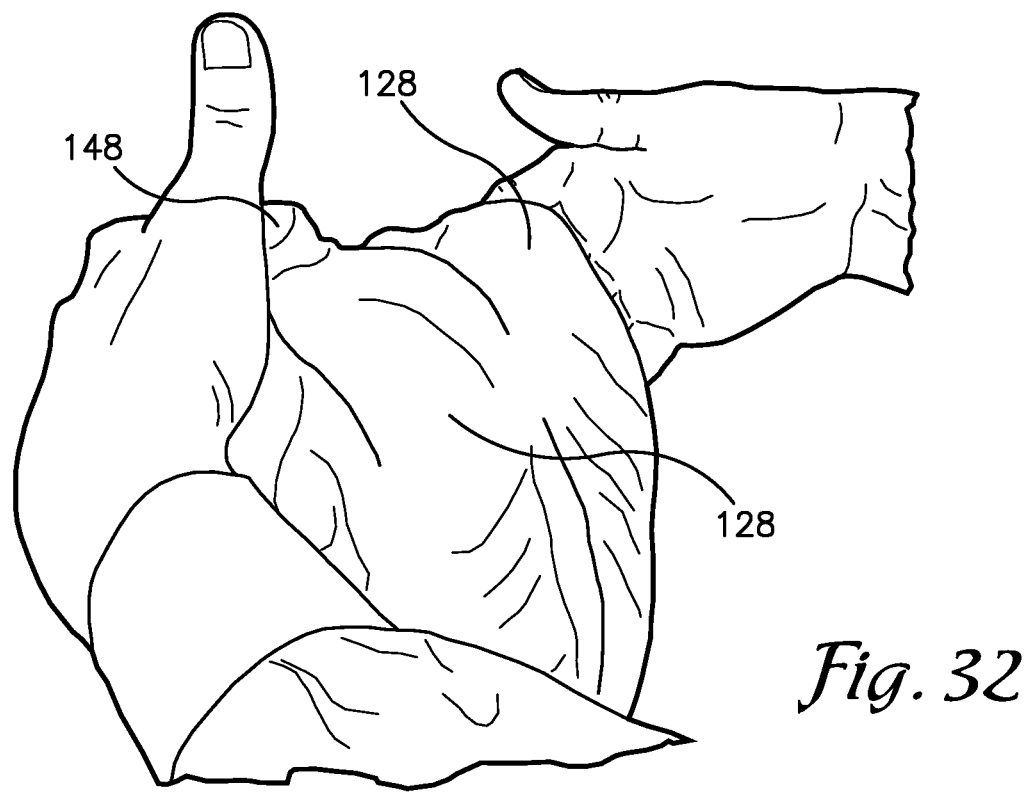
FIG. 32 is a perspective view from the front of the manual harvesting of the breast tissue butterfly fillet of a carcass on a fixture according to an embodiment of the exemplary manual tissue harvesting apparatus and method.
Figure 33:
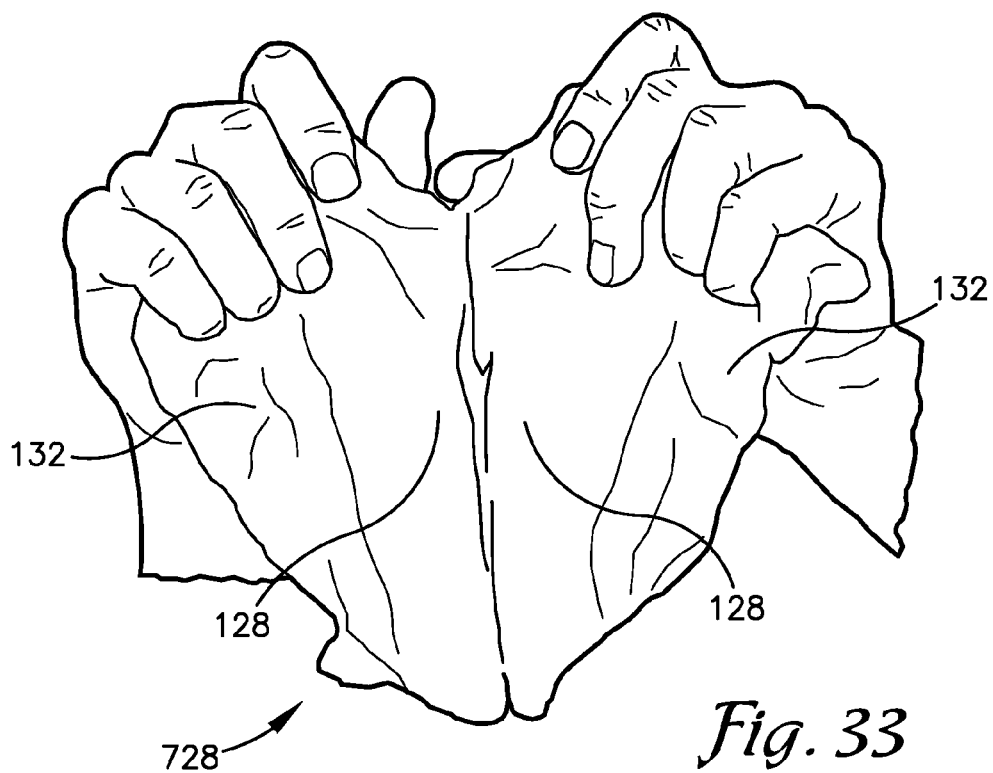
FIG. 33 is an elevation view of the manual harvested breast tissue butterfly fillet with back meat attached according to an embodiment of the exemplary manual tissue harvesting apparatus and method.
Figure 34:
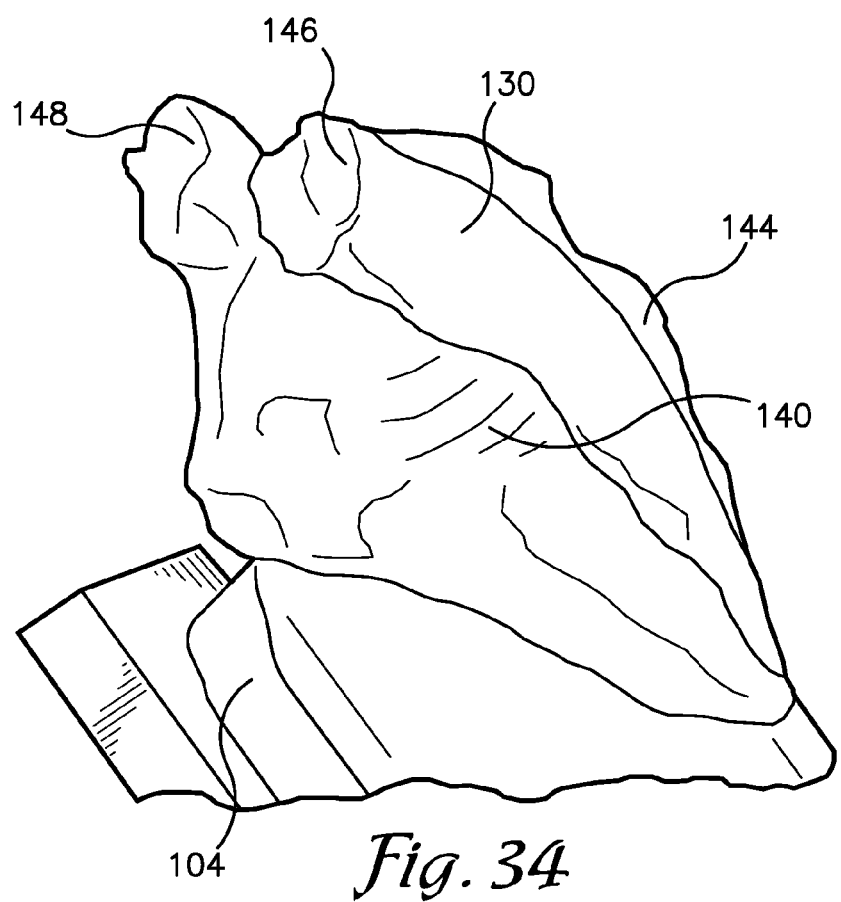
FIG. 34 is a lateral side elevation view of a carcass on a fixture with the breast tissue butterfly fillet removed.
Figure 35:
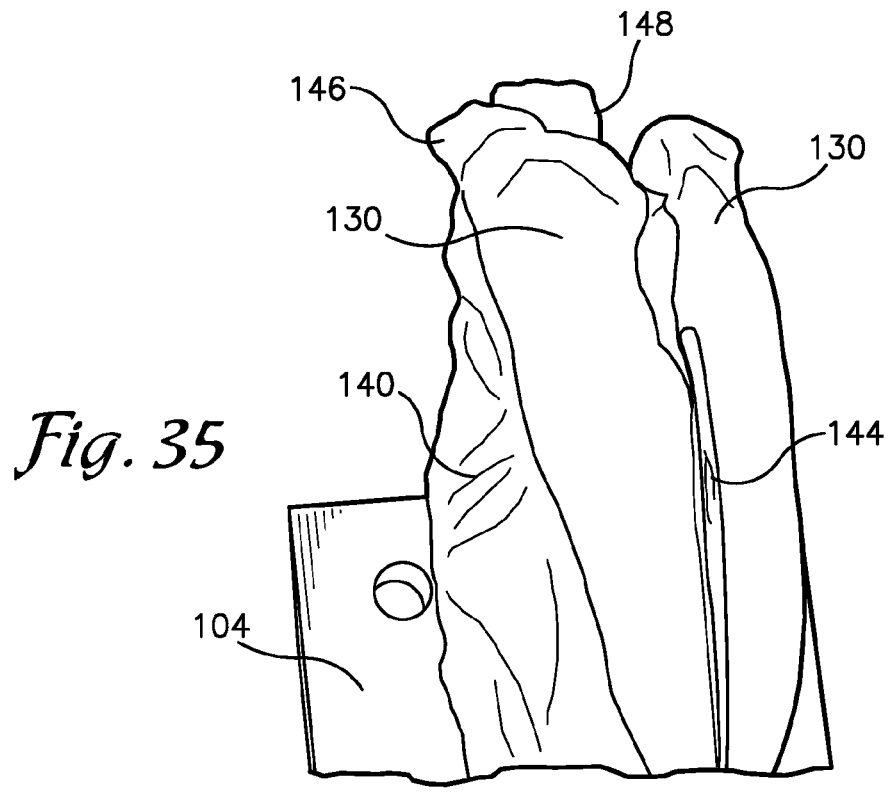
FIG. 35 is a perspective view of the ventral end of a carcass on a fixture with the breast tissue butterfly fillet removed.

Referring to FIGS. 31-32, an operator may manually manipulate and remove the breast 128 tissue from the carcass 122 as a butterfly fillet by placing the palm of their hands at the top of the breast 128 tissue, grasping the top of the breast 128 tissue near the neck opening 124, and moving the hands down and away from the carcass 122 toward the vent 126, thereby separating the breast 128 tissue from the carcass 122 as a butterfly fillet 728 (FIG. 33). Once the breast 128 tissue butterfly fillet 728 is removed, the operator may then harvest the tenderloin 130 tissues (FIGS. 34-35).

Figure 36:
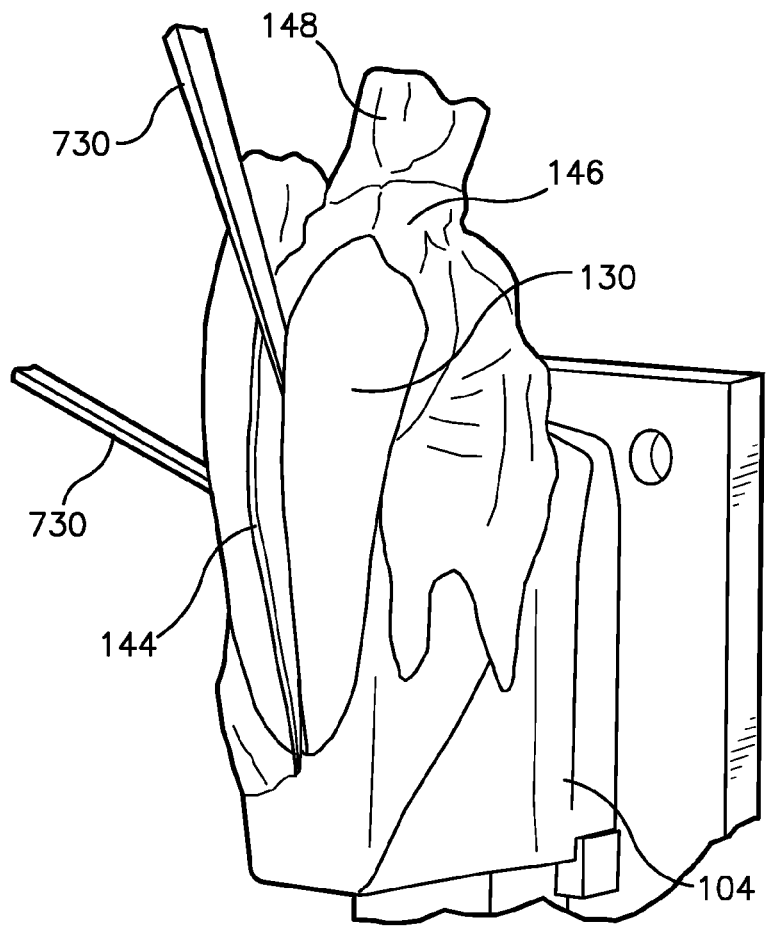
FIG. 36 is a perspective view of a carcass on a fixture with the neck opening positioned upward, and scraping the tenderloin tissue from the breast bone using a tool.
Figure 37:
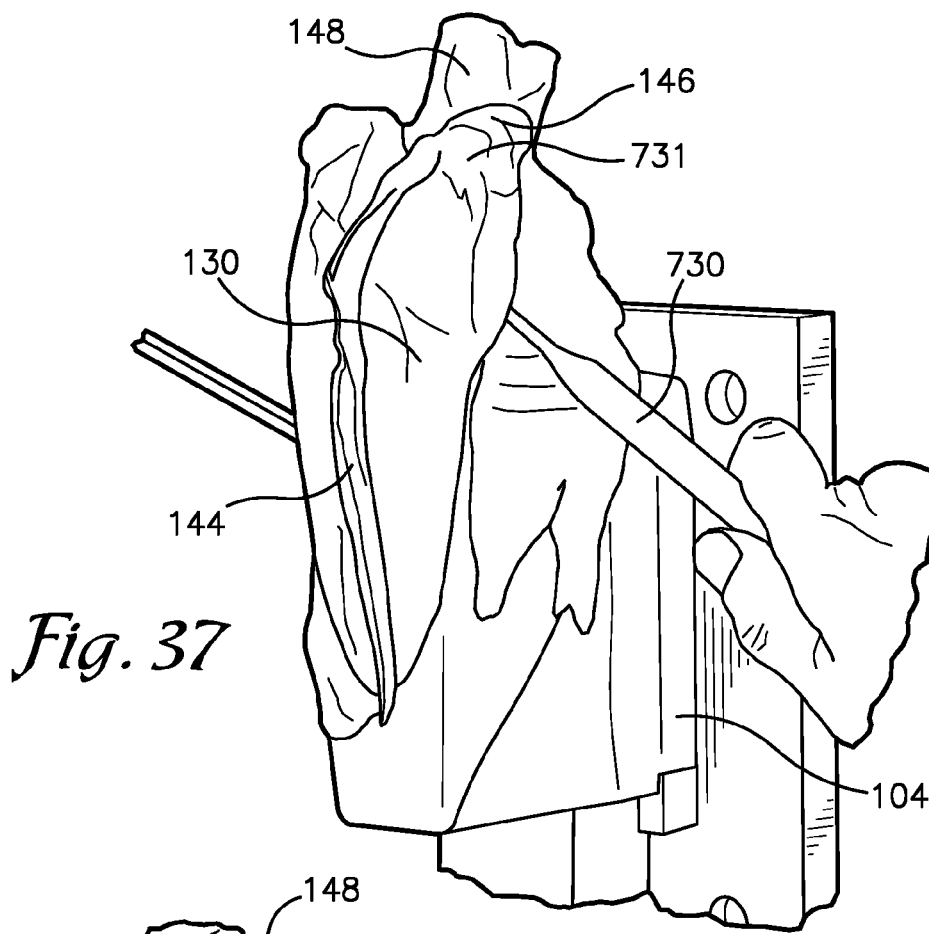
FIG. 37 is a perspective view of a carcass on a fixture with the neck opening positioned upward, and scraping the tenderloin tissue from the breast bone using a tool.
Figure 38:
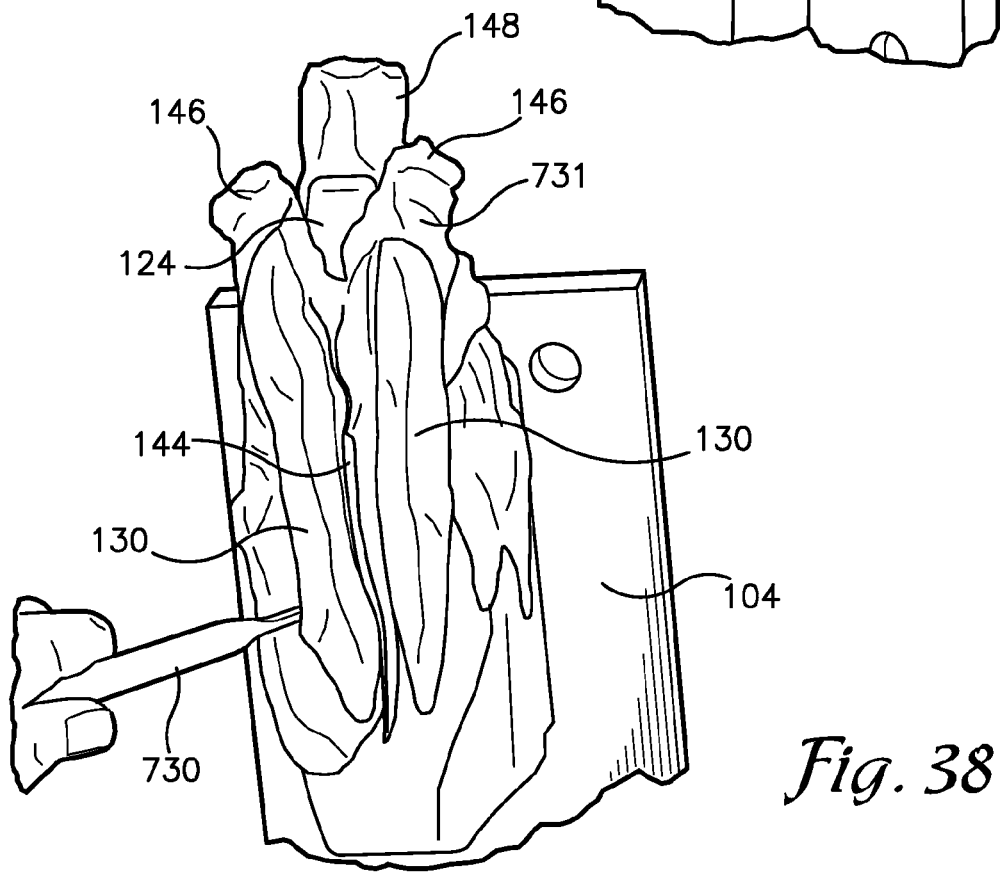
FIG. 38 is a perspective view of the ventral end of a carcass on a fixture with the neck opening positioned upward, and scraping the tenderloin tissue from the breast bone using a tool.
Figure 39:
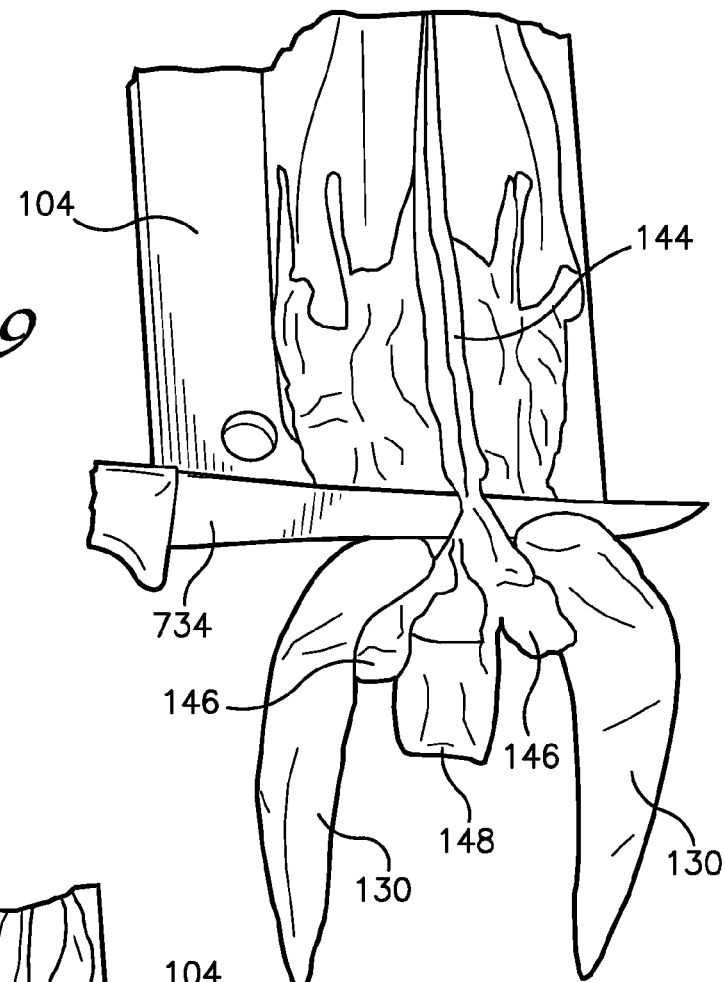
FIG. 39 is a perspective view of the ventral end of a carcass on a fixture with the neck opening positioned downward, and the tenderloin tissues released from their natural positions.
Figure 40:
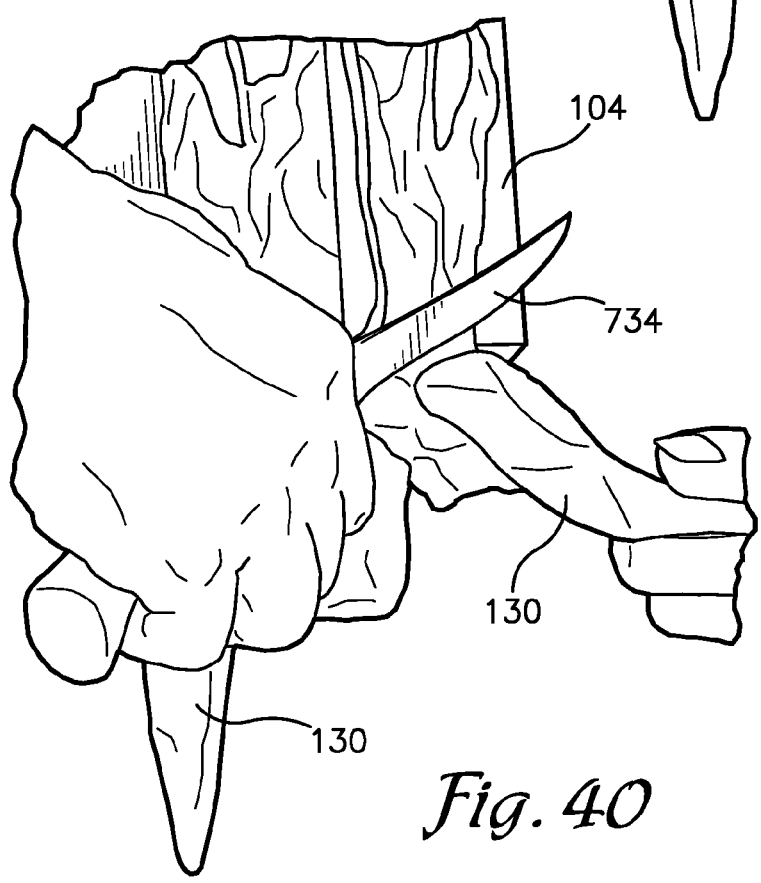
FIG. 40 is a perspective view of the ventral end of a carcass on a fixture with the neck opening positioned downward, and the tenderloin tissue being cut from the carcass.
Figure 41:
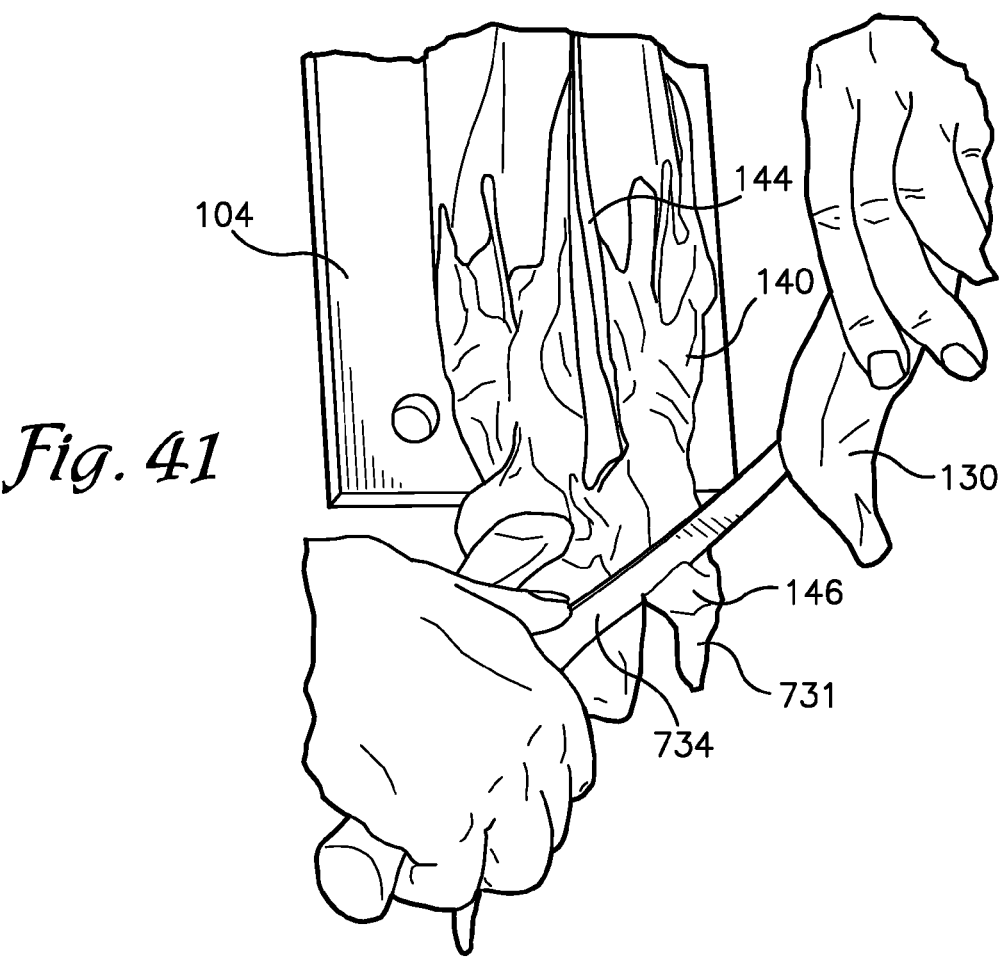
FIG. 41 is a perspective view of the ventral end of a carcass on a fixture with the neck opening positioned downward, and the tenderloin tissue being cut from the carcass.
Figure 42:
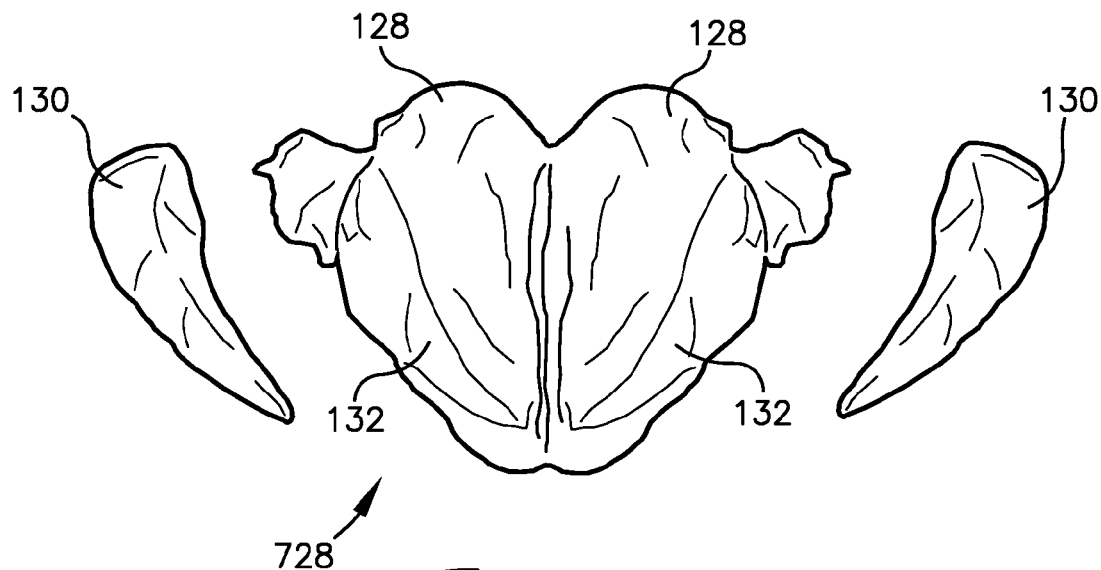
FIG. 42 is a perspective view of the breast tissue butterfly fillet with back meat attached, and the tenderloin tissue removed from the carcass.

Referring to FIGS. 36-38, the tenderloin 130 tissues are first separated from the breast bone 144 by scraping between the tenderloin 130 tissue and the breast bone 144 with a tool 730. Scraping releases the tenderloin 130 from its natural position on the carcass 122, and leaves the tenderloin 130 connected to the carcass 122 by a tendon 731 adjacent the neck opening 124. The scraping may be performed by hand, or may be performed by machinery such as a tool 730 connected to a scraping assembly. The carcass mount 104 is then reoriented by adjusting the carcass mount 104 to position the neck opening 124 in the downward direction causing the tenderloin 130 tissue to fall from their natural positions (FIG. 39). The tenderloin 130 tissue is then removed from the carcass by cutting the tenderloin 130 from the tendon 731 with a tool 734 including a knife, thereby maximizing the tenderloin tissue 130 harvested from the carcass 122 (FIGS. 40-41). The resulting harvested wanted tissues include a breast 128 tissue butterfly fillet 728, and two tenderloin 130 tissues (FIG. 42).

It will be appreciated that the components of the automated deboning apparatus 102 can be used for various other applications, and may be retrofitted to other automated animal processing apparatuses. The automated deboning apparatus 102 is an exemplary representation of the mechanical tissue manipulation assemblies, and the mechanical and manual tissue manipulation steps may be carried out independently apart from the automated deboning apparatus 102. Moreover, the components of the automated deboning apparatus 102 can be fabricated in various sizes and from a wide range of suitable materials, using various fabrication techniques, and may be a component of a larger animal processing assembly.

It is to be understood that while certain aspects of the disclosed subject matter have been shown and described, the disclosed subject matter is not limited thereto and encompasses various other embodiments and aspects.

The invention claimed is:

1. A method of harvesting tissue from a bird carcass, comprising:
   mechanically scoring a lateral side of the carcass-between a point adjacent a neck opening and below a shoulder extending laterally along a side of the carcass below the ribs and a point adjacent a posterior end of the carcass;
   mounting the carcass on a fixture; and
   manually partially removing a breast tissue and tenderloin tissue from the carcass.

2. The method of claim 1, further comprising the steps of:
   grasping the breast tissue, with a hand, adjacent the neck opening; and
   pushing the hand toward the posterior end of the carcass completely removing the breast tissue from the carcass.

3. The method of claim 1, further comprising the steps of:
   scraping between the breast bone and the tenderloin tissue;
   positioning the neck opening downward; and
   cutting the tenderloin tissue from the carcass.

4. A method of harvesting tissue from a bird carcass, comprising:
   mechanically scoring a lateral side of the carcass between a point adjacent a neck opening and below a shoulder extending laterally along a side of the carcass below the ribs and a point adjacent a posterior end of the carcass;
   mechanically partially separating a breast tissue and a tenderloin tissue from a breast bone;
   positioning the neck opening upward;
   grasping the breast tissue adjacent the neck opening;
   encircling the tissue with two digits of a hand; and
   moving the hand toward a vent at the posterior end of the carcass to completely separate the tissue from the carcass.

5. The method of claim 4, further comprising the steps of:
   scraping between the breast bone and the tenderloin tissue;
   positioning the neck opening downward; and
   cutting the tenderloin tissue from the carcass.

6. A method of harvesting tissue from a bird carcass, the bird carcass extending between a neck opening at an anterior end and a vent at a posterior end, the bird carcass including a breast bone and a breast tissue at a ventral end, ribs at a dorsal end, a tenderloin tissue disposed beneath the breast tissue, and a shoulder at an anterior end, the method comprising the steps of:

mounting the carcass on a fixture; and using an automated mechanical device to score the breast tissue between a point below the shoulder and the ribs extending laterally along a side of the carcass and a point adjacent the posterior end of the carcass.

7. The method of claim 6, further comprising the step of separating the breast tissue and tenderloin tissue from the breast bone.

8. The method of claim 7, wherein the separation of tissues comprises a partial separation that is done mechanically, and the method of harvesting tissue from a bird carcass further comprises:

positioning the neck opening upward;

grasping the breast tissue with a hand adjacent the neck opening and encircling the breast tissue with two digits of a hand; and pushing the hand toward the posterior end of the carcass completely removing the breast tissue from the carcass.

9. The method of claim 8, further comprising the steps of:

grasping the tenderloin tissue with a hand adjacent the neck opening and encircling the tenderloin tissue with two digits of a hand; and pushing the hand toward the posterior end of the carcass completely removing the tenderloin tissue from the carcass.

10. The method of claim 9, further comprising the steps of:

scraping between the breast bone and the tenderloin tissue;

positioning the neck opening downward; and cutting the tenderloin tissue from the carcass.

11. The method of claim 6, further comprising the steps of:

positioning the neck opening upward;

grasping the breast tissue with hands near the neck opening; and pushing the hands toward the posterior end of the carcass removing the breast tissue from the carcass in the form of a butterfly fillet.

12. The method of claim 11, further comprising the steps of:

scraping between the breast bone and the tenderloin tissue;

positioning the neck opening downward; and cutting the tenderloin tissue from the carcass.

13. The method of harvesting tissue from a bird carcass, comprising:

mechanically scoring a lateral side of the carcass between a point adjacent a neck opening and below a shoulder extending laterally along a side of the carcass below the ribs and a point adjacent a posterior end of the carcass;

partially separating a breast tissue and a tenderloin tissue of the carcass from a breast bone;

mounting the carcass on a fixture;

positioning the neck opening upward;

grasping the breast tissue with a hand adjacent the neck opening;

pushing the hand toward the posterior end of the carcass completely removing the breast tissue from the carcass;

grasping the tenderloin tissue with a hand adjacent the neck opening;

pushing the hand toward the posterior end of the carcass completely removing the tenderloin tissue from the carcass;

scraping between the breast bone and the tenderloin tissue; and positioning the neck opening downward; and cutting the tenderloin tissue from the carcass.

\* \* \* \* \*